(12) United States Patent
Sandholm et al.

(10) Patent No.: US 8,972,278 B2
(45) Date of Patent: Mar. 3, 2015

(54) RECOMMENDING PRINT LOCATIONS

(75) Inventors: Thomas E. Sandholm, Sunnyvale, CA (US); Jose Diego Ferreira Martins, Porto Alegre (BR); Deny Joao Correa Azzolin, Porto Alegre (BR)

(73) Assignee: Hewlett-Packard Development Company, L.P., Houston, TX (US)

( * ) Notice: Subject to any disclaimer, the term of this patent is extended or adjusted under 35 U.S.C. 154(b) by 417 days.

(21) Appl. No.: 13/233,820

(22) Filed: Sep. 15, 2011

(65) Prior Publication Data
US 2013/0073358 A1 Mar. 21, 2013

(51) Int. Cl.
*G06Q 30/06* (2012.01)
*G06F 17/30* (2006.01)

(52) U.S. Cl.
CPC ...... *G06F 17/30241* (2013.01); *G06Q 30/0631* (2013.01)
USPC ............ 705/14.19; 707/725; 705/14.48

(58) Field of Classification Search
CPC .......... G06F 17/30241; G06Q 30/0631
USPC .......... 705/14.11, 14.19, 14.48, 14.69
See application file for complete search history.

(56) References Cited

U.S. PATENT DOCUMENTS

| | | | |
|---|---|---|---|
| 7,321,919 B2 | 1/2008 | Jacobs et al. | |
| 7,856,360 B2* | 12/2010 | Kramer et al. | 705/1.1 |
| 7,881,984 B2 | 2/2011 | Kane, Jr. et al. | |
| 7,882,102 B2 | 2/2011 | Vechersky | |
| 8,359,206 B2* | 1/2013 | Whalin et al. | 705/1.1 |
| 8,645,366 B1* | 2/2014 | Acharya | 707/723 |
| 2001/0029531 A1* | 10/2001 | Ohta | 709/223 |
| 2003/0014446 A1* | 1/2003 | Simpson et al. | 707/527 |
| 2003/0053135 A1* | 3/2003 | Simpson et al. | 358/2.1 |
| 2004/0137855 A1* | 7/2004 | Wiley et al. | 455/88 |
| 2006/0218114 A1 | 9/2006 | Weare et al. | |
| 2006/0266830 A1 | 11/2006 | Horozov et al. | |

(Continued)

FOREIGN PATENT DOCUMENTS

| | | |
|---|---|---|
| JP | 2005284938 | 10/2005 |
| JP | 2005327020 | 11/2005 |

(Continued)

OTHER PUBLICATIONS

Miluzzo et al.; "Sensing Meets Mobile Social Networks: The Design Implementation and Evaluation of the CenceMe Application"; Computer Science, Dartmouth College, Hanover Copyright 2008 ACM 978-1-59593-990-6/8/11.*

(Continued)

*Primary Examiner* — John G Weiss
*Assistant Examiner* — Adam Chornesky

(57) ABSTRACT

Systems, methods, and computer-readable and executable instructions are provided for recommending print locations. Recommending print locations can include receiving recommendation, user, and geographic information for a first mobile print location (MPL) and a second MPL. Recommending print locations can also include indexing the recommendation, user, and geographic information for each of the first MPL and the second MPL as an automatically created uniform resource indicator (URI) on an MPL system. Furthermore, recommending print locations can include ranking the first MPL and the second MPL based on the recommendation, user, and geographic information and presenting a list, via a user interface, of the ranked first MPL and the second MPL.

8 Claims, 15 Drawing Sheets

(56) References Cited

U.S. PATENT DOCUMENTS

| | | | |
|---|---|---|---|
| 2007/0143318 | A1 | 6/2007 | Hendrey et al. |
| 2009/0100018 | A1 | 4/2009 | Roberts |
| 2009/0276303 | A1* | 11/2009 | Singhal .................... 705/14.11 |
| 2010/0042611 | A1 | 2/2010 | Cruzada |
| 2010/0076951 | A1 | 3/2010 | Lyle et al. |
| 2010/0076968 | A1 | 3/2010 | Boyns et al. |
| 2010/0280920 | A1 | 11/2010 | Scott et al. |
| 2010/0332324 | A1 | 12/2010 | Khosravy et al. |
| 2011/0002009 | A1 | 1/2011 | Ohashi |
| 2011/0093340 | A1* | 4/2011 | Kramer et al. ............ 705/14.58 |
| 2011/0119217 | A1 | 5/2011 | Moon et al. |
| 2011/0137818 | A1 | 6/2011 | Goad et al. |
| 2011/0258049 | A1* | 10/2011 | Ramer et al. ............. 705/14.66 |
| 2013/0073358 | A1* | 3/2013 | Sandholm et al. ......... 705/14.11 |
| 2013/0148163 | A1* | 6/2013 | Hashimoto ................ 358/1.15 |

FOREIGN PATENT DOCUMENTS

| | | |
|---|---|---|
| JP | 2006178743 | 7/2006 |
| JP | 2009146063 | 7/2009 |
| WO | WO2011019338 | 2/2011 |

OTHER PUBLICATIONS

Yingchen, et al., "An Ontology-based Approach for Mobile Personalized Recommendation", 2009 IITA International Conference on Services Science, Management and Engineering, Computer Science and Technology Department, East China Normal University, Shang Hai, China, Published: Jul. 11-12, 2009, pp. 336-339.

Sandholm, et al., "Global Budgets for Local Recommendations", Social Computing Lab, HP Labs, Palo Alto, CA 94304, USA, RecSys2010, Sep. 26-30, 2010, Barcelona, Spain, 8 pages.

Sandholm, et al., "Real-time, Location-aware Collaborative Filtering of Web Content", HP Labs, Social Computing Group, CaRR 2011, Feb. 13, 2011, Stanford, CA, USA, 5 pages.

Deshpande, et al., "Item-Based Top-N Recommendation Algorithms", University of Minnesota, ACM Transactions on Information Systems, vol. 22, No. 1, Jan. 2004, pp. 143-177.

Bennett, et al., "The Netflix Prize", KDDCup'07, Aug. 12, 2007, San Jose, CA, USA, pp. 3-6.

Unknown., "HTTP JSON REST API Reference", Site: Gloe Developer Wiki at http://wiki.hpgloe.com, Source p. HTTP JSON REST API Reference at http://wiki.hpgloe.com/restreference, Published: Jan. 5, 2011, Revised: Feb. 4, 2011, 5 pages.

Unknown., "How do I add content to Gloe?", Retrieved on Jul. 21, 2011 from http://wiki.hpgloe.com/noteapi, 2 pages.

Unknown., "Gloe Developer Wiki", Retrieved on Jul. 21, 2011 from http://wiki.hpgloe.com/, 1 page.

Unknown., "Gloe API Documentation", Published: Jul. 5, 2010, 7 pages.

Unknown., "HP Gloe API v1", Published: Dec. 5, 2009, 4 pages.

* cited by examiner

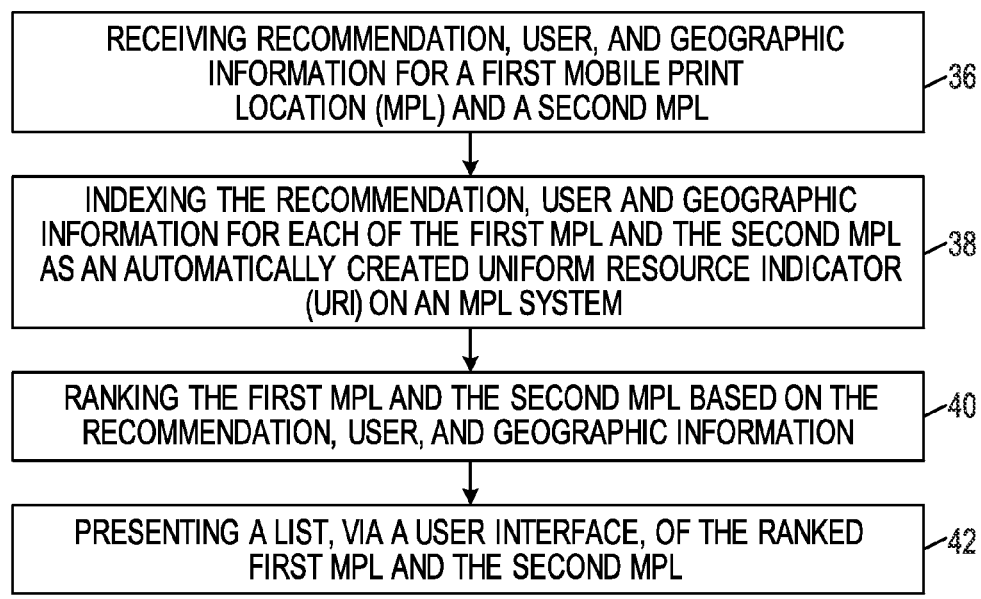

RECOMMENDING PRINT LOCATIONS

BACKGROUND

As an increased number of print providers are on-line, it is apparent that having users sift through large lists of print providers with no differentiation criteria, or those based on geographic location alone, can be time consuming. Moreover, print provider lists may not be based on user-centric criteria.

BRIEF DESCRIPTION OF THE DRAWINGS

FIG. 2 is a flow chart illustrating an example of a method for recommending print locations according to the present disclosure.

DETAILED DESCRIPTION

An example method for recommending print locations may include receiving recommendation, user, and geographic information for a first mobile print location (MPL) and a second MPL. The recommendation, user, and geographic information for each of the first MPL and the second MPL can be indexed as an automatically created uniform resource indicator (URI) on an MPL system, and the first MPL and the second MPL can be ranked based on the recommendation, user, and geographic information. A list can be presented, via a user interface, of the ranked first MPL and the second MPL.

Figure 1A:
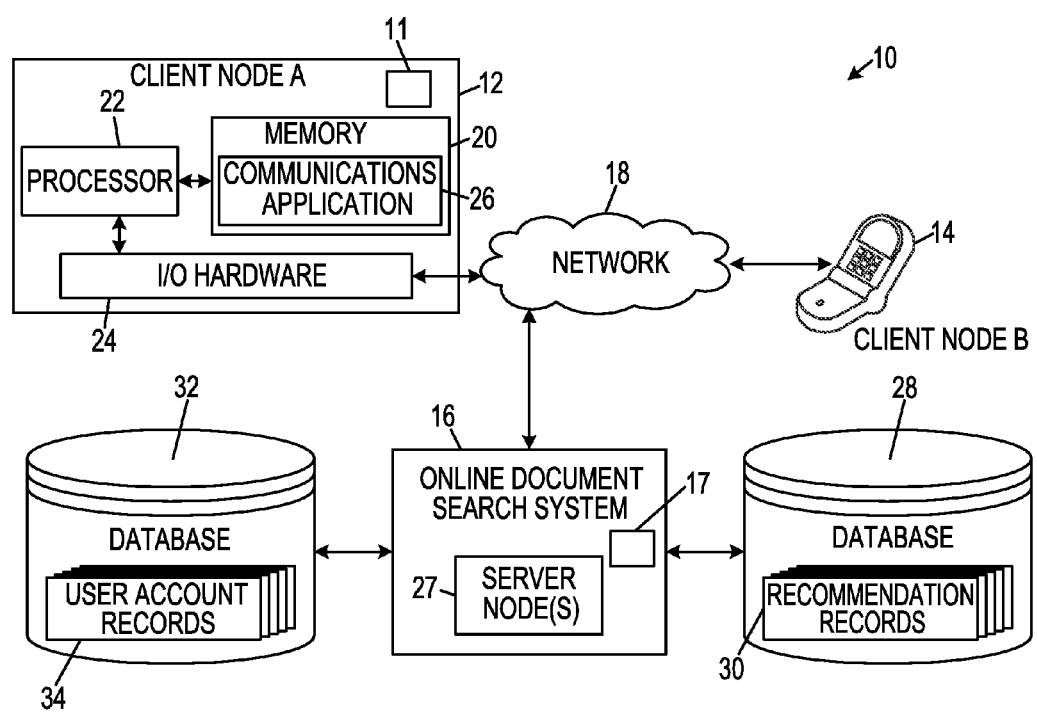
FIG. 1A is a diagrammatic view of an example of a network communication environment that includes a first client network node, a second client network node, and an online search system.

FIG. 1A is a diagrammatic view of an example of a network communication environment that includes a first client network node, a second client network node, and an online search system. FIG. 1A shows an example network communications environment 10 that includes a first client network node 12 (Client Node A), a second client network node 14 (Client Network Node B), and a search system 16 (e.g., online document and/or web page) that are interconnected by a network 18. One example of such a search system 16 includes a recommender system. The first client network node 12 includes a computer-readable memory 20, a processor 22, and input/output (I/O) hardware 24 (including a display). The processor 22 executes at least one communications application 26 that is stored in the memory 20. The second client network node 14 may be configured in substantially the same way as the first client network node 12.

The communications applications 26 operating on the first and second client network nodes 12, 14 communicate with the online search system 16. The communications application 26 typically operates on a client network node that includes software and hardware resources which, together with administrative policies, user preferences, and other settings, define a local configuration that influences the administration of connections with other network nodes. The communications applications 26 also provide respective interfaces for receiving commands from the communicants. In addition, the communication applications handle the submission of recommendations from the client network nodes 12, 14 to the online search system 16 and the presentation of search results from the online search system 16 to the client network nodes 12, 14. In some examples, the communication applications 26 are implemented by web browser applications that respectively include extensions or plugins that handle communications with the online search system 16. A recommendation may be any user feedback regarding online content. For example, recommendations can include star ratings (e.g., 1 to 5 stars), binary rating (e.g., yes or no), and/or other methods of recommending content. A result may be a suggestion of content provided by the platform based on previous user recommendations of the content.

As shown in FIG. 1A, multiple different mobile platforms (e.g., client node A 12 and client node B 14) can be provided with a respective client side API 11 capable of providing a web enabled (e.g., hypertext transfer protocol (HTTP) GET) function call to the online search system 16. The web enabled function call to the online search system 16 is received by a respective online search system 16 side API 17. The online search system API can be implemented as a JSON representational stat transfer (REST) API.

The online search system 16 can include one or more server nodes 27 that provide network infrastructure services that cooperate with the communications applications 26 in the process of establishing and administering network connections with the client nodes 12, 14.

The online search system 16 maintains a database 28 that contains records 30 of geo-tagged recommendations for, for example, online documents or MPLs, that were received from the client network nodes 12, 14. Each recommendation record 30 describes an association between a respective online document or MPL identifier that identifies a respective online document MPL, recommendation information (e.g., an amount of credit allocated to the online document or MPL), and a geographic location identifier that identifies a respective geographic location. An online document or MPL identifier may be a resource of information that is accessible over a network using a unique reference (e.g., a uniform resource identifier (URI), such as a uniform resource locator (URL)). Examples of online documents and/or MPLs identified in one or more URIs and/or URLs include an electronic mail message, a web page, a business listing, a data file, a news group posting, a blog, a wiki, and/or a web advertisement.

For example, the geographic location can be a geographic location of a user providing the recommendation at the time of the recommendation or a geographic location of a provider of the online document or MPL. An online document or MPL identifier may be a resource of information that is accessible over a network using a unique reference (e.g., a uniform resource identifier (URI), such as a uniform resource locator (URL)). Examples of online documents and/or MPLs identified in one or more URIs and/or URLs include an electronic mail message, a web page, a business listing, a data file, a news group posting, a blog, a wiki, and/or a web advertisement.

Each recommendation record 30 also optionally may include (i) a respective user identifier that identifies a user of the respective client network node that sent a submission from which the recommendation was derived, (ii) a respective channel identifier that identifies a respective category that is assigned to the associated online document or MPL, and (iii) a reference to a related URL, which may be used to bring up recommendations/notes when that URL is opened in a browser application.

In some examples, the online search system 16 additionally maintains a second database 32 that contains records 34 of user accounts. The user account records 34 typically store contact information, an amount of recommendation credit that currently is available for submitting recommendations, and other information relating to the respective users of the client network nodes 12, 14.

The network 18 may include any of a local area network (LAN), a metropolitan area network (MAN), and a wide area network (WAN) (e.g., the internet). The network 18 typically includes a number of different computing platforms and transport facilities that support the transmission of a wide variety of different media types (e.g., text, voice, audio, and video) between network nodes.

In some examples, the online search system 16 includes a back-end service that uses dynamic database sharding to partition the data efficiently for scalable geo-location (e.g., find nearby and rank) queries. Databases (e.g., organized collections of records that are presented in a standardized format that can be searched by computers) described herein, may be stored on a single computer-readable data storage medium on a single computer or they may be distributed across multiple computer-readable data storage media on one or more computers. Furthermore, such databases may be geographically partitioned ("geo-partitioned") database is a database partitioned according to different geographic location identifiers.

In the examples described herein, a bridge between a relational database management system (RDBMS) and one or more application clients may be provided to provide a feature rich social location-based service through an open API. In an example, the system scales out based on geographic partitioning. Furthermore, some implementations may not rely on geospatial key-value stores but rather use the capabilities of a full RDBMS. Consequently, more sophisticated queries may be supported efficiently locally.

A Geohash algorithm is leveraged to map locations in queries into geographic areas. In one example, the areas constitute Grid cells of 97×97 miles using a 3 character, 32 letter alphabet. Search inquiries are limited to 30 miles and can touch between 1-4 Grid cells, called shards. Each shard is implemented as a RDBMS table. The tables are located at runtime making it easy to distribute content from different geographic regions on different server nodes 27 in a cloud/data center. With this scheme 32×32×32=32768 shards can be created in use. When a new item is recommended in a new shard, that shard may be created in real time in-band (e.g. on the same computing platform). Thus, not all possible shards have to be created. According to this example, to serve about 7 million recommendations spread globally in the inhabited areas on Earth as few as 12,000 shards may be needed.

Groups of tables/shards can be collected but some hotspot shards may by off-loaded to external nodes. The server nodes are designed to be stateless such that operations may be performed efficiently with only local data. In some implementations, only authentication and reporting data are kept global.

Because of this design, the shard tables are also heavily de-normalized. Apart from that, the shard tables may allow the same expressive SQL queries as any traditional RDBMS. Instead of joins being performed, a mechanism akin to GROUP_CONCAT in MySQL (grouping columns instead of joining columns from multiple tables) may be performed. The table queries can also perform radius boxing to avoid calculating the exact distance using Haversine arithmetic for more than the items that are in range.

In an example, if a query is touching more than one shard in its radius scope a SQL union of the shard results will be used in the stored procedure layer of the database or in the application server if the shards are located in different database servers.

Given this highly distributed infrastructure feeding new data into the system and creating global reports can be highly parallelized and performed concurrently by multiple cores or by multiple nodes in a MapReduce cluster. Apart from uploading new data into the shards, this kind of parallel processing can also be performed when computing contribution rewards, most popular site trends, and channel heatmaps.

In some implementations, the recommendations are not allowed span partitions for efficiency. In some implementations, within the same shard group (e.g., sorted region of shards hosted on the same database server), recommendations are limited by a user-specified radius away from a particular location (e.g., latitude, longitude coordinate) and the total number of hits requested. Both of these have upper limits to fit the display layouts of the client network nodes and to preserve server scalability.

In another example, an application programming interface (API) is provided that can be used from a web enabled client (e.g., HTTP get mobile client) including a web browser to recommend and query content by location, users, and tags as well as to retrieve personalized recommendations. Such an API may be implemented as a set of routines, protocols, and tools (e.g., rules and specifications) that software programs can follow to communicate with one another. In one implementation, a lightweight extensible markup language (XML) and JSON remote interface is provided to be accessible from a wide range of devices and web browsers. This open platform may allow developers to create any number of complementary APIs for the different client mobile platforms.

That is, this open API may allow developers to mashup location aware discovery and sharing of content with numerable use cases. Herein, middleware may be provided to allow generic, real-time, geo-aware tasks including: popularity ranking of content, social filtering of content, channel/tag popularity ranking, local (channel-based) content expert discovery, folksonomy tagging of content, distance ranking of content, collaborative filtering of content, time-relevancy of content, advertisement and auctioning of content (including second price ad auctioning), prediction market arbitrage of content to forecast future events, live polling of content popularity, coverage-limited tagging of content, feeds of new content views, feeds of new content ratings, syndication of rating to social media platforms, third party single sign-on authentication, and/or real-time notifications of content updates.

A client side API 11 enables a web enabled mobile client to interface with the online search system API described next. As described herein, an online search system (e.g., an online document or MPL search system) 16 API 17 is provided which communicates with a client network node among various different mobile platforms and receives, via the online API, a recommendation (rec) web enabled function call to recommend an online document or MPL from the client network node. The rec function call can include a geographic location identifier for the client network node and a selected online document or MPL as parameters. The API operates on the function call to pass the online document or MPL identifier as an attribute to the online search system.

According to one or more examples, an online document or MPL API is provided to receive another (second type) rec web enabled function call from the client network node to submit a comment in association with the given online document or MPL. This rec function call may include the geographic identifier parameter. In addition, this rec function call may pass a note attribute with text and a reference attribute associated with the selected online document or MPL identifier to the online search system.

In one example of this second type rec web enabled function call, the same rec REST API operation is performed passing in a notes attribute with the text of the attribute instead of a URL attribute. To associate the note with an online document or MPL, a reference (ref) attribute to associate to the note is passed in with the URL. This type of note may also be associated with the creator/initial recommender of the item, exposing the creator more prominently than with the first type rec web function call. The creation time likewise also may be exposed when following the URL that is created from the note (and returned with the API). This example can include notes of 300-4000 characters. A comment using regular notes will store a notes entry that can be retrieved when following the notes URL.

Another example of this second type of rec web function call includes a more lightweight note referred to as a page note (PNote) that may not require any state lookup on the online search system 16 server nodes 27, and that may allow more control of the format of the URL created. This type of note is self-contained in the URL. This note type can include notes that are less than 100 characters where a URL allows up to 300 characters. Following the URL will show a web page similar to the regular notes web page, but all the information displayed is available in the URL. This feature may be used to create a very large number of items to recommend with a small amount of text for each item. This model may be used in polling applications where users can create their own geo-tagged, ad-hoc polls.

To create the PNote the following URL structure may be used: http://www.recommendersystem.com/json/pnot/?q=<PNote> <PNote> :=<Title>,<Content>, Where <Title> denotes the title of the note, and <Content> may be an arbitrary text string. XML, HTML or JavaScript may not be used in either the content or the title. The <PNote> part is URL encoded as it is passed and an HTTP GET parameter. This URL may be recommended and tagged into any arbitrary geolocation and follows all the rules for regular URLs in the search system 16. That is, this URL is entered in the system with an API call to the rec operation and retrieved with an API call to the getrec operation. At that point the geolocation and tag/channel associations are made.

Another example of this second type of rec web function call is referred to herein as Quick Notes (QNote). The QNote is similar to PNotes in that they are self-contained. QNotes, however, contain a little more structure: The main idea behind the QNote is to fix or pin the location associated with the note as opposed to leaving it up to end users to decide what location the note should be associated with. This feature may be used in the online search system 16 to integrate with point of interest (POI) databases that contain very little more than the venue name and address. The venues are fixed in a location and hence can reliably provide point-to-point direction with the location encoded in a QNote.

To create the QNote the following URL structure may be used: http://www.recommendersystem.com/json/pnot/?q=<QNote> <QNote> :=<Latitude> <Longitude> <Site> <PNote> <PNote> :=<Title>,<Content>. The <Site> part is by some clients used to pick up a logo to display but may be an arbitrary URL. The <PNote> part follows the same rules as described above for PNotes.

This URL may be recommended and tagged following all the rules for regular URLs in the search system 16. That is, this URL is entered into the system with an API call to the rec operation and retrieved with an API call to the getrec operation. At that point the tag/channel association is made.

In an example of a request for an MPL recommendation, the MPL identifier is a URL and the MPL API received a get recommendation (getrec) web enabled function call from the client network node to get MPL recommendation information. The getrec function call includes a geographic location identifier as a parameter for the client network node. Further, the MPL API responds to the getrec function call by returning, via the MPL API, real time ranked recommendations for multiple MPLs in JSON format from an MPL database in an MPL search system. The multiple MPLs are indexed online in the database according to URLs. For instance, an index model may be built in real time (e.g., indexing as information is received in band to a given computing platform) using databases that are partitioned in a predetermined manner (e.g., using geographically pre-partitioned databases). The MPL API 17 can return objects JSON attributes, in response to the getrec function call, having a JSON array of 10-tuple with elements output format.

The MPL API can implement a JSON representational stat transfer (REST) AP, and receiving the web enabled function calls include receiving a http get function call to communicate with multiple HTTP GET enabled client network nodes from different mobile platforms.

In an example, the MPL API receives the note function call and operates thereon to create a URL comment identifier to be indexed online in association with the selected MPL in the MPL search system. The MPL API operates on the note function call to pass a note attribute with text which includes encoding the note attribute with text within the created URL comment identifier to be indexed.

The MPL identifier can be a URL and the MPL API operates to respond to the getrec function call by returning, via the MPL API, real time note attributes with text in association with the selected MPL in JSON format from an MPL database in the MPL search system. In various examples, the MPL API operates to receive a rec function call that includes a recommending user identifier as a parameter for the client network node and a recommendation credit identifier (bid) as a parameter in association with a respective geographic location identifier parameter and MPL identifier parameter. The MPL API operates to pass the recommendation credit identifier as an attribute to the MPL search system; and decrement a budget (e.g., "submission credit") of a submitting user account associated with the recommending user identifier.

In parallel to exchanging (e.g., receiving and returning) function calls, the online search system 16 also may run data-mining and web crawling agents that automatically populate the database 28 with geo and URL data for specific channels in order to maintain a high overall quality even for long tail information items that might be requested by very few users or very rarely. In some examples, the online search system 16 leverages attention economy, collaborative filtering, and information market research in order to improve the accuracy of the list of ranked MPL identifiers that are send to the client network nodes.

Figure 1B:
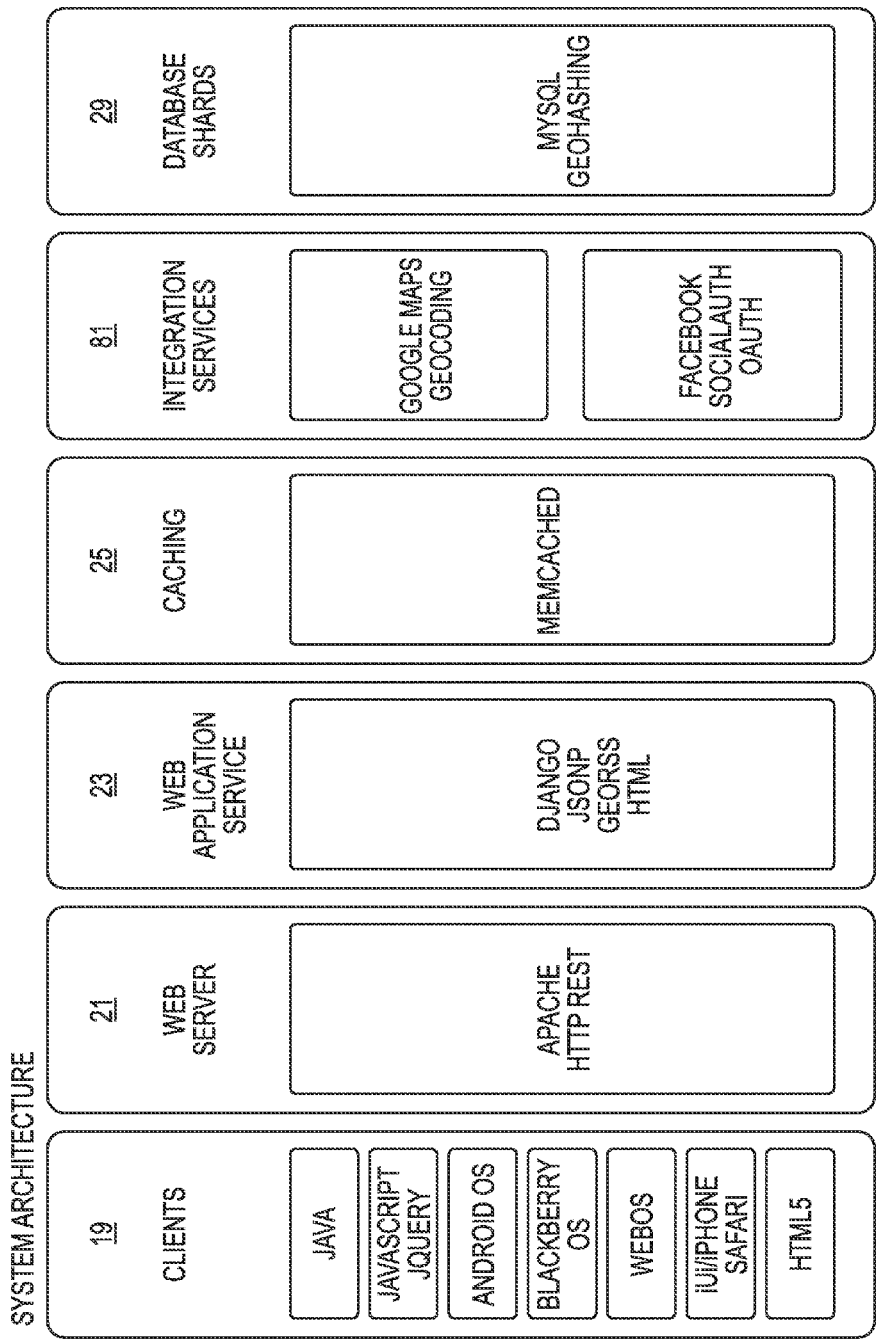
FIG. 1B illustrates an example of an architecture of a platform for online content services according to the present disclosure.

FIG. 1B illustrates an example of an architecture of a platform for online content services according to the present disclosure. Such platform for online content services may include a number of components that function together to provide online content services. For example, the platform can include client interfaces, web servers, web application services, caching, integration services, and/or databases, such as those described in more detail below with respect to FIG. 1B. A platform for online content services can include client interfaces 19 (e.g., provided via Java, JavaScript JQuery, Android operating system (OS), BlackBerry OS, Web OS, iUi/iPhone Safari, HTML5). While the client interfaces 19 typically run on the client device (e.g., as firmware or software stored in memory resources of the client and executed by the client's processor resources), such interfaces may generally be considered to be part of the platform when they operate in conjunction with other platform components to provide online content services.

The platform can include web servers 21 (e.g., Apache, HTTP representational state transfer (REST)) that can include processing and memory resources. Each web server 21 in the platform does not have to run the full platform stack. Rather, each web server 21 can be associated with a particular database 29 (e.g., a MySQL database) to provide an online content service for the content in that particular geo-partitioned (e.g., geo-hashed) database. The web servers 21 can provide the functionality associated with primitives, as described herein.

A primitive is a generic functionality provided by a platform for online content-specific services. A primitive can have multiple models that can be used with different online content and/or services without having to recreate the functionality of the generic primitive. Primitives can include, for example, an activity log of explicit and/or implicit use and/or recommendations of content, an economic voting primitive for recommending content, a hierarchical folksonomy of tags, an interface with a social network, and a geomodel to partition data for efficient local retrieval, among others.

One primitive includes an economic recommendation model that provides a temporal budget of recommendations that can be submitted by a user for ranking content. In some examples, the number of recommendations that a particular user may make within a time span is limited by the amount of credit that the user currently has available. Recommendation credits (or tickets) may be granted or purchased and used to increase prominence of an online document or MPL in connection with a geographic location. Recommendation credits can be provided to a user in a discrete amount per time period. For example, a user may receive 5 recommendation credits per week. Furthermore, a recommendation credit used by a user (e.g., when a user recommends content) can have a fixed duration after which it is no longer considered by the platform when providing results (e.g., the user-provided recommendation can expire). User-provided recommendations can be used by the platform to generate a result (e.g., suggestion) for an online document or MPL in response to a later query by a user.

Taking the economic recommendation primitive as an example of a primitive, the economic recommendation primitive can be used when building applications for recommending different types of online content, such as an MPL service and a restaurant location service, as will be described in more detail with respect to FIG. 1F). An economic recommendation model can include a temporal budget of recommendations that can be submitted by a user for recommending content. A temporal budget of recommendations implies that the recommendations are somehow limited in time (e.g., the user has a certain number of recommendations available per unit time and/or the recommendations have a certain lifespan or expiration).

Another example of a primitive is an activity log that stores implicit and/or explicit recommendations of geo-partitioned content by a plurality of users. An explicit recommendation is a recommendation, submitted by the user, of a particular item of the content. An implicit recommendation is a recommendation of a particular item of the content based on, for example, a viewing and/or using of the content by the user. As used herein, a recommendation of the content can imply a recommendation of content itself (e.g., a good and/or service) and/or a recommendation of a provider of the content. In some instances, it may not be possible to distinguish between the content and the provider.

The platform can include web application services 23 (e.g., via Django, JavaScript Object Notation with Padding (JSONP), GeoRSS, HTML). The web application services 23 can provide a search system side API, as described herein. An example of a web application service 23 is an online content service for an MPL, as described herein. The platform can include a caching system 25 (e.g., Memcached). The caching system 25 can be a general purpose distributed memory caching system used to speed up dynamic database-driven websites by caching data and objects in RAM to reduce the number of times an external data source (such as a database or API) is read.

The platform can include integration services 81 (e.g., for integration with Google Maps, Geocoding, Facebook Connect, SocialAuth, OAuth). Authentication can occur over an integration service 81 or with a native (to the platform) authentication protocol. For authentications using an integration service 81, a user can register to obtain a nickname and recommendation key. In some examples, anonymous users can also use the platform, however anonymous users may have stricter recommendation credit quotas. Integration services 81 can help provide personal content services for a user (e.g., by collaborative filtering of geo-partitioned content based at least in part on previous similar explicit and/or implicit recommendations submitted by other users). Integration services 81 can help provide social content services including social filtering of the geo-partitioned content based at least in part on previous explicit and/or implicit recommendations submitted by friends (e.g., "friend recommendations") of a user (e.g., where "friends" of the user are determined according to an interface between the platform and a social network such as Facebook). Integration services 81 can help provide time-aware and/or location-aware content services including time relevancy and distance ranking of the geo-partitioned content.

The platform can include databases 29 (e.g., MySQL databases, Geohashed databases). The databases 29 can be provided with dynamic database sharding, as described herein (e.g., where each geographic region has its own real or virtual database containing region-specific recommendation tables). Each database 29 can be on its own node, or multiple databases 29 can be located on a single node. In some examples, the region-specific recommendation tables can be partitioned across nodes. User-submitted recommendations can be confined to a geo-partitioned database associated with a respective item of the content being recommended.

The platform can host services that create and recommend social, personalized, time- and location-aware online content. The platform can scale to serve a large amount of geo-partitioned data to a large number of users. The platform can be designed around generic primitives that can be used to serve a wide array of content-specific services on the same infrastructure.

Figure 1C:
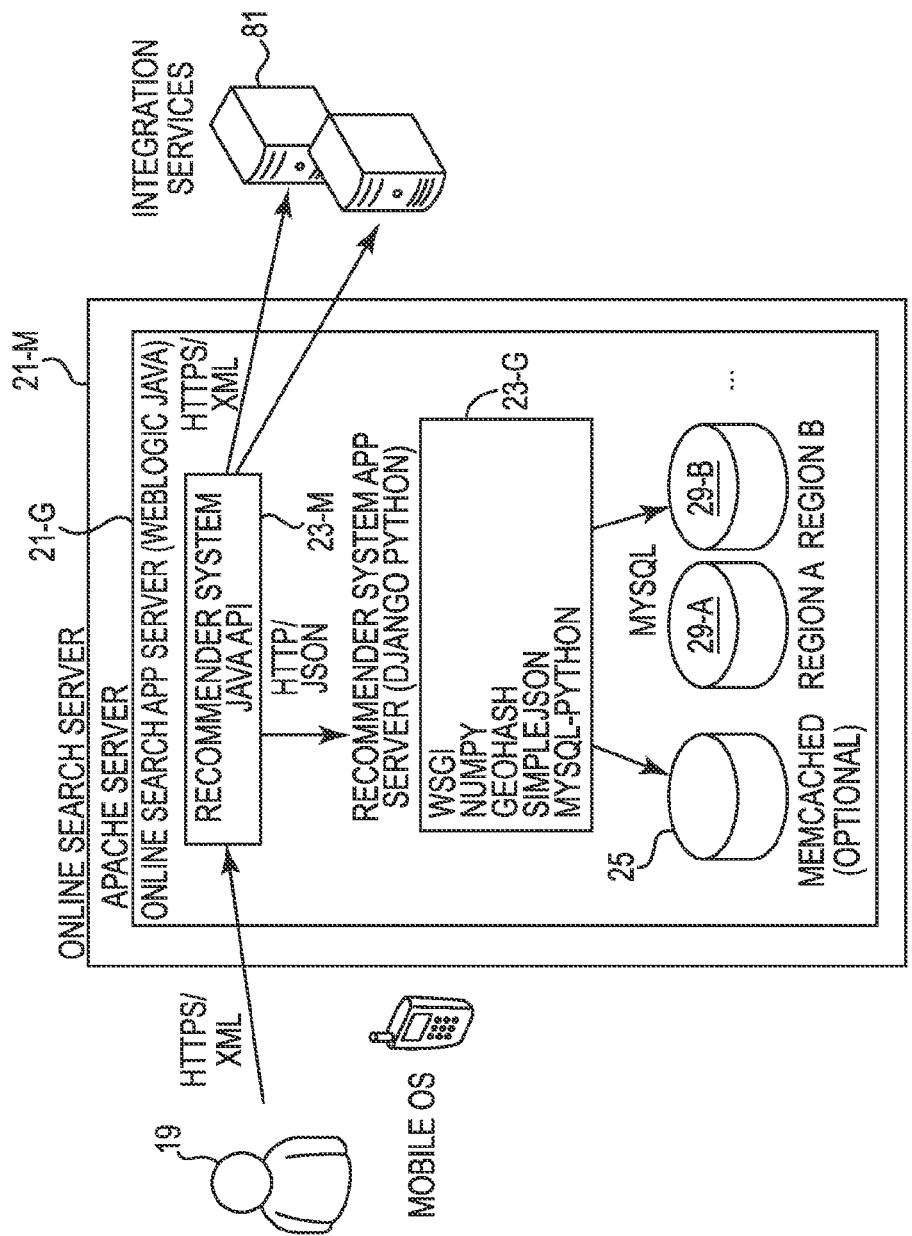
FIG. 1C illustrates an example implementation of a system architecture of a platform for online content services according to the present disclosure.

FIG. 1C illustrates an example implementation of a system architecture of a platform for online content services according to the present disclosure. The system architecture of the platform for online content services illustrated in FIG. 1C can be analogous to the system architecture illustrated in FIG. 1B. The platform can include client interfaces 19 (e.g., provided via a HTTP secure (HTTPS)/XML interface with a mobile OS of a client's mobile device).

The platform can include web servers 21 (e.g., an MPL server 21-M hosting an Apache server 21-G) that can include processing and memory resources. In an example implementation, the Apache server 21-G can host an MPL application server 23-M (e.g., providing a recommender system Java API via WebLogic Java, as described herein). The MPL application server 23-M can communicate with integration services 81 via HTTPS/XML. The MPL application server 23-M can communicate with a recommender system application server 23-G hosted by the Apache server 21-G via HTTP/JSON. The recommender system application server can be provided via a Django Python web framework that can include a web server gateway interface (WSGI), an extension to the Python language supporting large multidimensional arrays and matrices and accompanying mathematical functions (Numpy), a hierarchical spatial data structure that subdivides space into grid elements (Geohash), SimpleJSON, and/or MySQL-Python, among others.

The recommender system application server 23-G can interface with a caching system 25 (e.g., Memcached). The caching system 25 can be a general purpose distributed memory caching system used to speed up dynamic database-driven websites by caching data and objects in RAM to reduce the number of times an external data source (such as a database or API) is read. The recommender system application server 23-G can interface with databases (e.g., database 29-A and database 29-B). Database 29-A and database 29-B can represent different nodes of a geo-partitioned MySQL database.

Figure 1D:
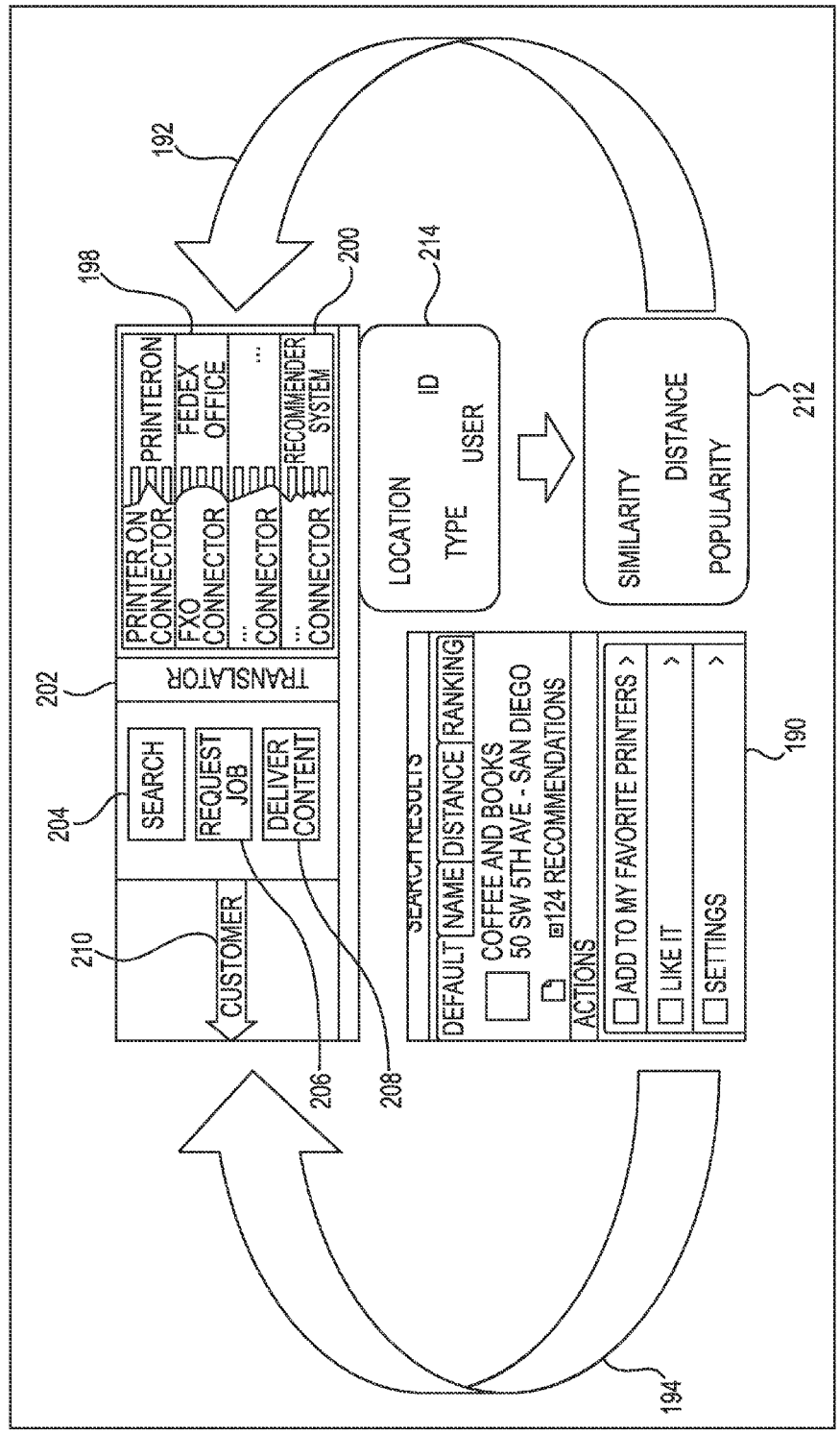
FIG. 1D is a block diagram of an example relationship between mobile print location (MPL) or online search system user operations and a recommender system according to the present disclosure.

FIG. 1D is a block diagram of an example relationship between online document or MPL user operations and a recommender system. A recommender system, can work as a recommender engine with and/or within an online document or MPL system to recommend certain online documents or MPLs to users in search of an online document or MPL (e.g., a mobile print provider). Via an example user interface 190, a number of online document or MPL options can be displayed to a user. Also via user interface 190, choices including recommending a certain online document or MPL, using a certain online document or MPL, and/or adjusting personal settings regarding an online document or MPL system can be displayed to a user.

An online document or MPL system can work with connectors, and these connectors can be printing partners (e.g., FedEx Office 198) or auxiliary services, such as recommender system 200. A user, or customer 210, can search for online documents or MPLs 204, request print jobs 206, and provide the print job to the online document or MPL and/or request to have an online document or MPL deliver the print job or print content 208. These requests can be made via user interface 190, which may be presented on a mobile device, such as a smart phone. This is illustrated in FIG. 1D as arrow 194. Translator 202 can translate these customer requests into calls to the aforementioned connectors for locations and print jobs. As illustrated at 214, a customer may also be able to filter his or her print job request by previous personal preference (e.g., entering a user identifier), location of the online document or MPL, and/or type of print job (e.g., color, high resolution, black and white, etc.).

The online document or MPL system, working together with the recommender system, can sort and return the results to the customer in a number of ways. As illustrated at 212, the results can be ordered by distance from the user, similarity of online documents or MPLs, and/or popularity of the online document or MPL. For example, a default result can be distance from the customer, but if the customer's location is not exactly known, the results may be displayed in a different order. The results can also be displayed in alphabetical order by the name of the online document or MPL. In some examples, a connector (e.g., FedEx Office 198) can privilege some of its results on the top of a result list according to some partner contract definition. Each search result can have an identifier, and these identifiers can be passed to a recommender system, as illustrated by arrow 192, which can annotate the search result with recommendation data (e.g., user recommendations of an online document or MPL). This annotation can allow for additional ordering criteria, where the most recommended online document or MPL is listed first.

Figure 1E:
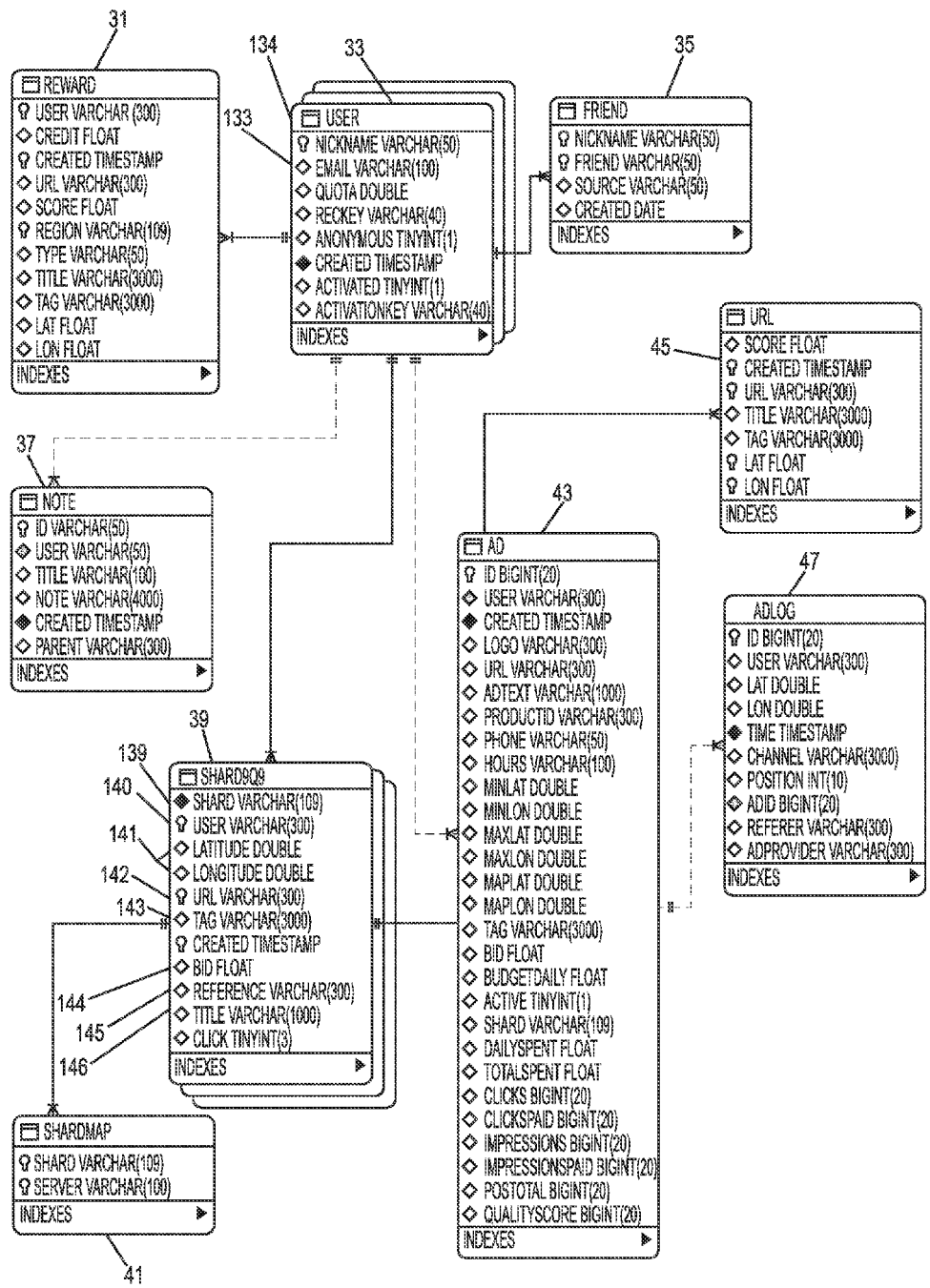
FIG. 1E illustrates a data structure within a memory storing data for access by an application program being executed in connection with an online search system according to the present disclosure.

FIG. 1E illustrates a data structure within a memory storing data for access by an application program being executed in connection with an online search system according to the present disclosure. Such a data structure may be stored in memory and can include information resident in one or more databases on a single computer or across a distributed computing environment. Furthermore, the data structure can include a plurality of attribute data objects containing different information from the one or more databases. As described above one example of an online search system, discussed herein, includes an online document or MPL search system 16. As discussed in connection with FIG. 3A, a server node 27, 60 to the MPL search system 16 can include processor 62 and memory resources 64, 68.

Figure 3A:
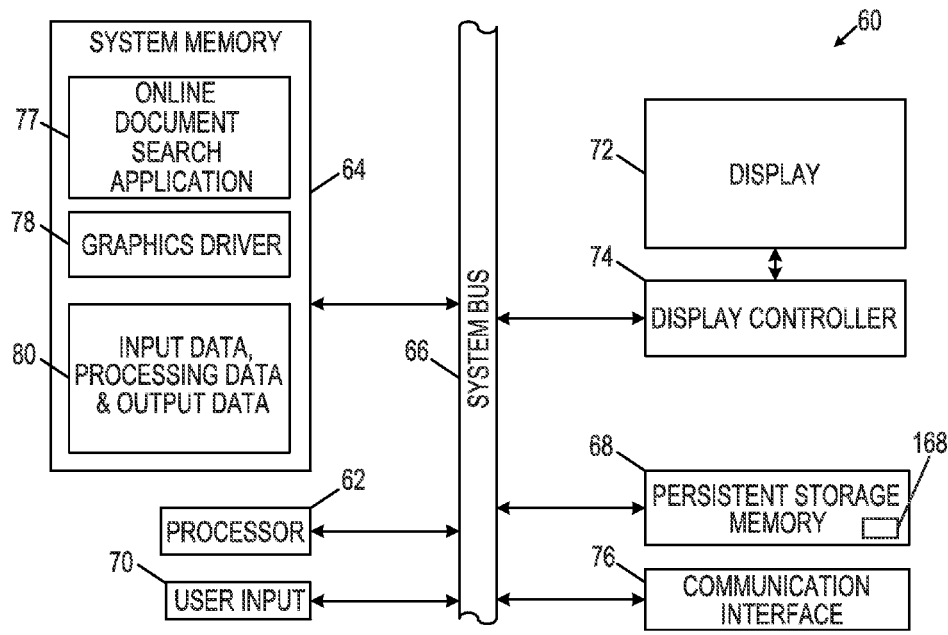
FIG. 3A is a block diagram of an example of a network node according to the present disclosure.
Figure 3B:
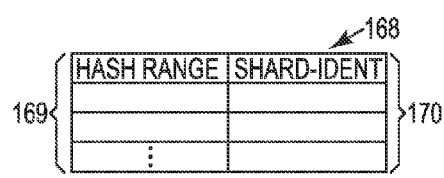
FIG. 3B illustrates a table to associate a given geo-hash value to a particular database server according to the present disclosure.

In one example, the memory includes a data structure stored in the memory 64, 68 and used by the application program 77 of FIG. 3A. The data structure of FIG. 1E can include information resident in a number of databases 28, 29 geographically-partitioned (geo-partitioned) in a predetermined manner according to a number of shards. FIG. 3A illustrates that the persistent memory 68 can include a geographically-hashed (geo-hash) look up table 168. FIG. 3B illustrates that the geo-hash look up table 168 contains a number of geo-hash ranges 169 associated with respective geographic location identifiers 170. The geo-hash look up table 168 receives a function call including a geographic location identifier and a client network node identifier as parameters to the function call and uses the table 168 to link the client network node to a particular server node 27, 60 and an associated geo-partitioned database 28, 29 containing the geo-hash ranges in a shard data object table 39 associated with the received geographic location identifier. Each shard data object table 39 can contain a number of data attributes including a shard data attribute 139, a user data attribute 140, a geographic location data attribute 141, a URL data attribute 142, a tag and/or comment data attribute 143, a bid data attribute 144, a referenced URL data attribute 145, a title data attribute 146, etc.

As shown in FIG. 1E a plurality of user data object tables 33 are part of the data structure. Each user data object table 33 contains respective user data attributes including user recommendation credit data attributes 133 associated with a particular user data attribute 134. The plurality of user data object tables 33 link to the particular server node 27, 60 and the associated geo-partitioned database 28, 29. As shown in FIG. 1E the data structure can link a particular user to the particular server node and the associated geo-partitioned database based on the geographic location identifier. In effect, the data structure can link a given client network node to the particular server node and a particular geo-partitioned database having MPL information indexed according to URLs based on the geographic location identifier.

In one example, using the tag and/or comment data attribute 145, the referenced URL data attribute and the user data attributes 134/140 the data structure can link the particular user to the particular server node and the particular gee-partitioned database in order to index by URL a comment, regarding an MPL from the particular user, based on the geographic location identifier.

As shown in FIG. 1E, the data structure can include a note object table 37, having a number of data attributes including an identifier data attribute, a user data attribute, a title data attribute, a note data attribute, a timestamp data attribute, a parent note data attribute, etc., logically linked to the particular user data object table 33. The data structure can further include a reward object table 31 physically linked to the particular user data object table 33. In one or more embodiments the data structure includes a friend object table 35 physically linked to the particular user data object table 33. An advertisement object table 43 is logically and physically linked (e.g., actually electronically connected versus logically linked as a virtual connection) to the shard object table 39. In one or more embodiments a URL object table 45 can be physically linked to the advertisement object table 43 and an advertisement log object table 47 can be logically linked to the advertisement object table 43.

Figure 1F:
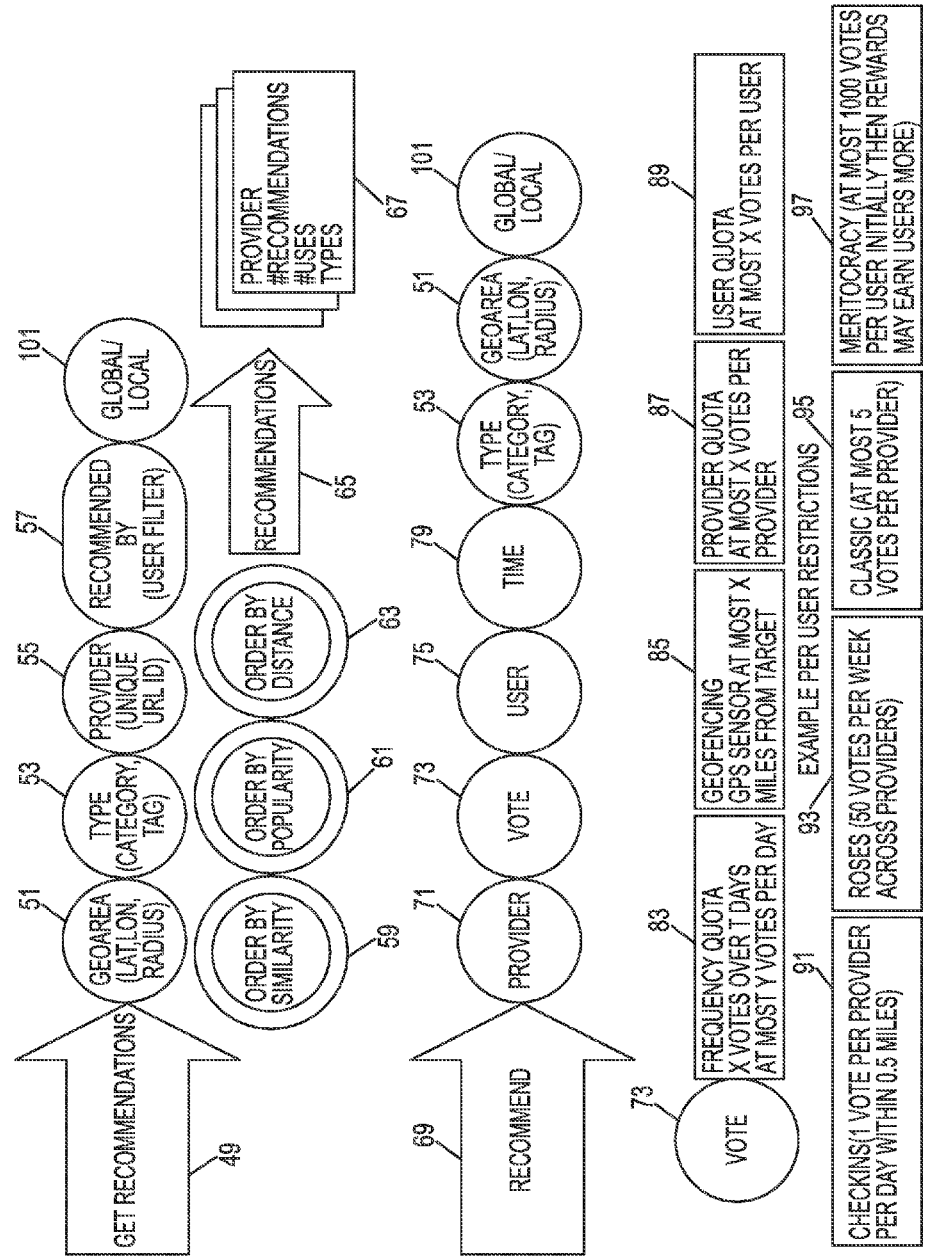
FIG. 1F is a flow chart illustrating an example operation of a platform for online content services according to the present disclosure.

FIG. 1F is a flow chart illustrating an example operation of a platform for online content services according to the present disclosure. A get recommendations command 49 can be received. Recommendation 65 can be filtered by geographic area 51, type 53, provider 55, by the user(s) making the recommendations 57, and/or by whether the recommendations are intended to be visible globally or locally 101. A geographic area can be defined by, for example, latitude, longitude, and/or be constrained by a particular radius from the geographic coordinates. Recommendations 65 can have a particular type 53 (e.g., a category and/or a tag, such as from a hierarchical folksonomy of tags). Recommendation 65 can be associated with an indication 55 of a particular provider of the content being recommended (e.g., a unique URL and/or identifier). In some instances the indication 55 of the provider can be generic to a provider of the content where a provider includes more than one specific instance. For example, when the content includes mobile print locations, one provider could be a commercial mailing company that has multiple instances (e.g., specific stores). In such examples, the identifier 55 of the provider can indicate either the commercial mailing company generically, or it can indicate a specific store of the commercial mailing company. Recommendations 65 can include an indication 57 of the users submitting the recommendations 65 and/or can be filtered such that particular users (e.g., "friends") have exclusive or more heavily weighted influence on the result (e.g., suggestion) of the recommendations 65.

Recommendations 65 can be ordered by similarity 59 (e.g., by similarity of content for divergent recommendations and/or by similarity of recommendations for divergent content), by popularity 61 (e.g., by total number of recommendations and/or a most favorable average recommendation), and/or by distance 63 (e.g., distance from the requesting user's present location). A provider 67 of content can be associated with various additional information such as an identifier of the provider (e.g., identifier 55), a total number of recommendations (e.g., explicit recommendations) for the provider and/or the provider's content, a total number of uses of the provider and/or the provider's content (e.g., implicit recommendations), and/or a type of the content being provided. For example, a type of content, in the case of a mobile print provider service, can include color printers.

A recommendation 69 submitted by a user can be accompanied by information including, for example, an identity of the provider 71 of the content being ranked, a value (e.g., "vote") 73 of the recommendation 69, an identity 75 of the user submitting the recommendation 69, a time 79 that the recommendation 69 was submitted, a type 53, a geographic area 51, and/or whether the recommendation was intended by the user to be visible globally (e.g., by everyone using the platform) or locally (e.g., by people within a certain geographic region 101. The identity 75 of the user can be a user ID as determined from a login directly to the platform, a user ID as determined according to an interface with a social networking service (e.g., Facebook® Connect), or a user ID as determined from network information such as an IP address, among others.

An economic recommendation model can be provided to help assure that the platform provides meaningful results (e.g., as opposed to some previous approaches that do not constrain users' ability to recommend various content). A user's recommendations (e.g., votes) 73 can be constrained by one or more economic recommendation models such as a frequency quota 83, geofencing 85, a provider quota 87, and/or a user quota 89. A frequency quota 83 can limit a user to providing X votes over T days and/or at most Y votes per day. Such frequency quotas 83 can help prevent users from spamming a particular provider with recommendations (e.g., where the user has a pecuniary interest in having a particular provider receive recommendations). Geofencing 85 can include the use of GPS or other location-determining means (e.g., IP address, cell triangulation, user-provided location) to limit a user's ability to provide recommendations to providers within X distance (e.g., miles) from the target provider being recommended.

Thus, geofencing 85 can help prevent users from recommending a particular provider when it is clear that the user is not currently using the services of the provider. A provider quota 87 can limit a particular provider of content to receiving at most X votes per a given time period. The provider quota 87 can help prevent a provider from cheating the system by having different users fraudulently recommend the provider. A user quota 89 can limit a user to providing no more than X unexpired votes. The user quota 89 can help prevent an "overly positive" user from providing what may be considered arbitrary recommendations for a multitude of content providers. The use of the variables X, T, and Y in the discussion of FIG. 1F is arbitrary and does not imply a correlation between different economic recommendation models (e.g., the X in the frequency quota 83 may be the same or different than the X in geofencing 85).

An economic recommendation model can limit a user's recommendations according to a "checkins" model 91 where a user is limited to X recommendations (e.g., 1 vote) per provider per time period (e.g., day) within a given distance (e.g., 0.5 miles). Such a model can help to assure that the user actually used the provider (e.g., via the distance requirement) and help to assure that the user does not spam a provider with recommendations (e.g., via the limited recommendations per time period requirement). An economic recommendation model can limit a user's recommendations according to a "roses" model 93 where a user is limited to X recommendations (e.g., 50 recommendations) per week across all providers. Such a model can help to limit "overly positive" users (e.g., as described above) from skewing results based on their recommendations. An economic recommendation model can limit a user's recommendations according to a "classic" model 95 where a user is limited to at most X recommendations (e.g., 5 votes) per provider. The use of the term "classic" does not imply that such a model has previously been used, but implies that such a model may be implemented as a more basic feature. An economic recommendation model can limit a user's recommendations according to a meritocracy model 97 where the user has an initial quota (e.g., 1000 votes) that can be replenished according to a rewards system (e.g., based on a determination of a quality of the feedback, such as meaningful and/or honest feedback by the user, among other determinations). The economic recommendation models described herein can be used independently or in any combination.

FIG. 2 is a flow chart illustrating an example of a method for recommending print locations according to the present disclosure. At 36, recommendation, user, and geographic information for a first MPL (e.g., a first mobile print provider) and a second MPL are received. The method can also include receiving recommendation, user, and geographic information for a plurality of MPLs.

The recommendation information can be in association with an MPL identifier identifying an MPL (e.g., the first mobile print provider) and its geographic location. Recommendations can include user feedback regarding online content, and it can also include performance recommendations received through a recommender system. The recommender system can be a social and location-aware recommender system that can give incentives to users to be truthful about their recommendations. For example, an MPL can issue printing or other discounts and/or incentives to a user based on recommendations received from a user for that MPL. The recommender system's ranking (e.g., displaying recommendation results) capability can be extended to MPLs by dynamically associating MPLs with unique URLs using a recommender system feature that allows self-contained, content-bearing URLs, which can be evaluated explicitly by users through recommendations as well as implicitly by using (e.g., printing to) an MPL. By tracking usage of print services when users print content, the most popular print services (e.g., the most used services by geographic region) can be identified. The users who are requesting to print, and are the source of the print information, may be considered source users. The recommender system can reward regular users by increasing a user's voting budget. Print providers can offer incentives users to return to their MPL by offering related discounts and/or other incentives to users who regularly use a certain MPL. Providers can also be offered incentives to provide users with MPL services via the recommender system.

Information can be can be retrieved from various print directory sources, and user recommendations (e.g., user evaluations) can be retrieved independently from the recommender system. The returned information, including geographic information, user information, recommendation information, and/or usage amount can be merged, and the directory results can be annotated with recommender system user recommendations. This merged information can be presented to a user via a user interface.

User information can include a location of a user requesting information. For example, a user may have a social networking profile that can be used to determine geographic or printing preferences. Furthermore, a user may have a global positioning satellite (GPS) capable mobile device that can provide user location information or other location information in association with a query. User location information can be used to determine nearby MPLs.

Retrieving the user recommendations can be done in parallel with a query of the recommender system for existing user recommendations for the MPLs. Items from a final list can be loaded into the recommender system whenever a user either recommends or uses an MPL. Information on where, when, and how much users print can also be used to provide users with incentives (e.g., discounts, offers, etc.) to print more often. Incentive offerings to the user can be presented to a user from an MPL via the recommender system when a user rates and/or utilizes the MPL. Evaluations of MPLs can also be provided by a friend of a user, wherein the friend is determined according to an interface with a social network. A user providing recommendations can remain anonymous throughout the process; however, an anonymous user may still be identified for tracking usage and recommendations through methods other than user sign-up (e.g., tracking an Internet protocol address). A user providing recommendations may also be restricted from providing recommendations if the user is not within a certain distance threshold of the MPL recommended.

The recommender system can also allow users to express satisfaction with a mobile print provider at a fine level of granularity on a continuous scale. A user can click on recommendation credit identifiers, or "votes", represented by a symbol (e.g., a rose) multiple times, but may be restricted by a total voting budget. These recommendation credits may have an expiration date. For example, a user may be awarded 10 "roses" to award to an MPL, and these roses may expire in 7 days. This "withering roses" effect can result in a process of MPLs being continuously evaluated. This can result in a greater incentive for providers to present higher quality MPLs, as well. For example, in the recommender system, an MPL recommendation (e.g., "rating") $R_l$ can be determined using a voting budget spent s, a current time t, an expiration time E, and an amount $s_{t,l}$ of the budget spent on item l in time period t. In an example, $$R_l = \sum_{t=0}^{E} s_{t,l}.$$

The use of a voting budget can result in increased accuracy of user ratings in the recommender system over previous ranking or recommendation systems such as a "Like" (e.g., "thumbs up") system and a "Star" (e.g., 1 to 5 star rating). For example, when a user rates, or recommends, the same MPL using a "Like" recommendation, a "Star" recommendation, and a recommender system recommendation, a correlation between actual print quality and the recommender system recommendation is increased over the print quality/recommendation correlation as it relates to a "Like" rating and/or a "Star" recommendation.

At 38, the recommendation, user, and geographic information are indexed for each of the first MPL and the second MPL. The information can be indexed as an automatically created URI on an MPL system platform. This automatically created URI can be created to decode and search MPLs. The recommendation, user, and geographic information can be stored in a database.

The first and second MPLs are ranked at 40, and this ranking can be based on the recommendation, user, and geographic information. The ranking can include organizing or ordering the MPLs. An MPL search system can index recommendation information and an MPL identifier in association with a geographic location identifier in a database stored on at least one computer-readable medium.

At 42, a list is presented, via a user interface, of the ranked first and second MPLs. In response to receipt of location information, the MPL system 16 can ascertain an MPL identifier associated with a geographic location identifier in the database that corresponds to the received location information. The ascertained MPL identifier can be ranked among others based on recommendation information, and the rankings can be presented in the list.

The list can be presented and sorted in a number of ways. The list can be sorted by the name of the MPL. For example, the list can be sorted alphabetically by the first letter of the MPL's name. The list can also be sorted based on a distance from a user to the first and second MPLs. For example, a user may request information about MPLs, and he or she may be presented with a list of providers in the order of closest to the user to furthest from the user. The user's location can be determined using a global positioning system (GPS) located in his or her phone, and a distance from the user to MPLs can be determined. The list can also be sorted based on performance recommendation information and recommender system user recommendations. Moreover, the list can be sorted based on a combination of the performance recommendation information and the MPL information. A provider may also pay to be placed near the top of the list. For example, the list order may be based on payment corresponding to a print provider's list location.

The list can also include user comments from others who have used the MPLs. These comments may relate to each of the first and second MPLs. These comments may also be displayed to a user, via a user interface, on a different view than that of the list.

FIG. 3A is a block diagram of an example of a network node according to the present disclosure. FIG. 3A shows an example 60 of the server network node 27 that includes a processor 62 (e.g., a CPU), a system memory 64, and a system bus 66 that couples processing unit 62 to the various components of the server network node 60. The processor 62 typically includes one or more processors, each of which may be in the form of any one of various commercially available processors, generically referred to herein as "processing resources." The system memory 64 typically includes a read only memory (ROM) that stores a basic input/output system (BIOS) that contains start-up routines for the server network node 60 and a random access memory (RAM). The system bus 66 may be a memory bus, a peripheral bus or a local bus, and may be compatible with any of a variety of bus protocols, including PCI, VESA, Microchannel, ISA, and EISA. The server network node 60 also includes a persistent storage memory 68 (e.g., a hard drive, a floppy drive, a CD ROM drive, magnetic tape drives, flash memory devices, and digital video disks) that is connected to the system bus 66 and contains one or more computer-readable media disks that provide non-volatile or persistent storage for data, data structures and computer-executable instructions.

A user may interact (e.g., enter commands or data) with the computer 60 using one or more input devices 70 (e.g., a keyboard, a computer mouse, a microphone, joystick, and touch pad). Information may be presented through a graphical user interface (GUI) that is displayed to the user on a display monitor 72, which is controlled by a display controller 74. The server network node 60 also typically includes peripheral output devices, such as speakers and a printer. One or more remote computers may be connected to the server network node 60 through a network interface card (NIC) 76.

As shown in FIG. 3A, the system memory 64 also stores an online search application 77, and a GUI driver 78, and input data, processing data, and output data 80. The online search application 77 is executed by the server network node 60 in order to implement the functionality of the online search system 16. In some embodiments, the online search application 77 interfaces with the GUI driver 78 and the user input 70 to control the operation of the online search system.

FIG. 3B illustrates a table 168 (e.g., a geo-hash value look table) to associate a given geo-hash value 169 (e.g., range) to a particular database server 170 (e.g., shard identifier). As shown in FIG. 3B, once a given geo-hash value is computed for a given received geographic location identifier from a particular client network node 12, 14 the computer executable instruction can be executed by the processor resource to determine which database server 28, 29 to link to and further access.

Figure 4:
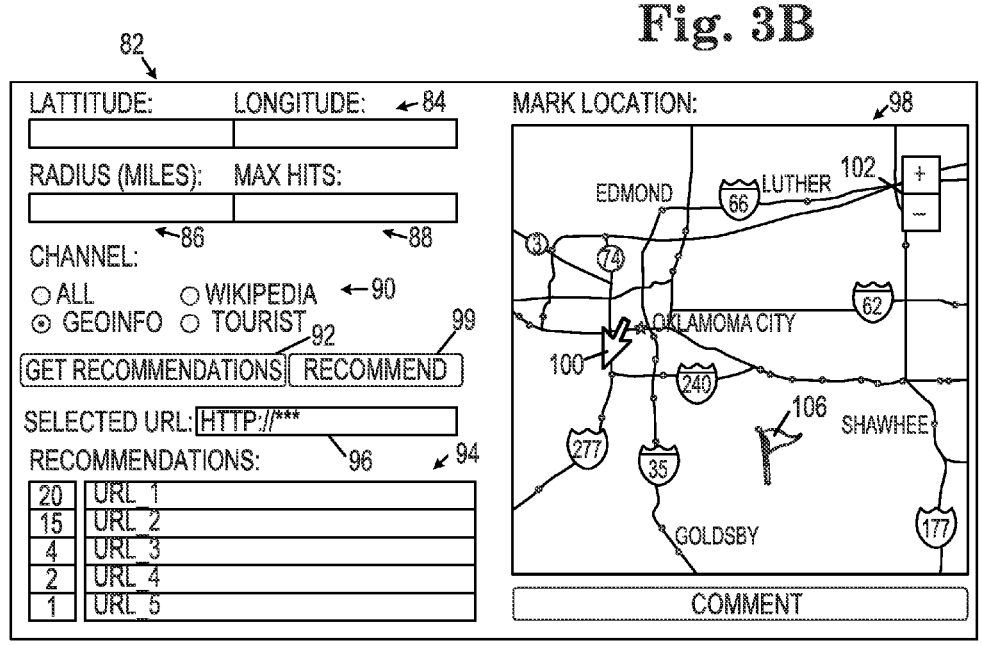
FIG. 4 is a diagrammatic view of an example of a client user interface according to the present disclosure.

FIG. 4 is a diagrammatic view of an example of a client user interface according to the present disclosure. FIG. 4 shows an example of a graphical user interface 82 that is generated by the communications applications 26 and displayed on the display of the client network nodes 12, 14. The graphical user interface 82 includes a geographic coordinates display area 84, a geographic range input area 86, an input area 88 for specifying a maximum number of search results, a channel selection area 90, a "Get Recommendations" button 92 for requesting online recommendations from the online search system 16, a "Recommendations" display area 94, a "Selected URL" display area 96, and a map area 98. The graphical user interface 82 also includes a "Recommend" button 99 that allows the user to submit a recommendation for the selected identifier appearing in the "Selected URL" display area 96.

The geographic coordinates display area 84 displays the latitude and longitude coordinates of a particular location. The latitude and longitude coordinates may be input by the user (e.g., by manually typing into the associated boxes, or by using a pointer 100 to select a location on a map that is displayed in the map area 98) or they may be obtained automatically by searching by address identifiers (e.g., street, zip, city etc) or obtaining a reading from a location sensor (e.g., a built-in GPS receiver) that is associated with the client network node. These geographic coordinates collectively constitute a geographic location identifier that identifies a particular location to the online search system 16 (e.g., MPL search system). The geographic range input area 86 allows the user to identify a target geographic location by specifying a value of a radius of a circular region that is centered at the latitude and longitude coordinates in the geographic coordinates display area 84. In other examples, the user may identify a target geographic location in other ways. For example, the user may use the pointer 100 to draw a rectangular boundary of the target geographic location on the map that is displayed in the map area 98. Alternatively, the user may use the magnification controller 102 to select a magnification level of the map in the map area 98 such that the entire geographic region appearing in the map area 98 corresponds to the target geographic location.

The user selects one of the channels in the channel selection area 90 to specify a channel that will be associated with a recommendation or that will be used by the online search system 16 to restrict the online search to only those online documents that are associated with channel identifiers that correspond to the specified channel. The user can select one of the channels as it applies to MPLs (e.g., "laser", "color", "high resolution", etc.) in the channel selection area 90 to specify a channel that will be associated with a recommendation or that will be used by the MPL search system 16 to restrict the MPL search to only those MPLs that are associated with channel identifiers that correspond to the specified channel.

In some examples, users are given the option to limit online searches to only those online documents and/or MPLs that are associated with recommendations from a target group of user identifiers. The target group of user identifiers may, for example, consist of the user identifiers for the user's friends, the user's family members, or the user's co-workers. The target group also may be used to allow self-filtering to provide a personal bookmarking service. The online search system 16 can store the identified target groups in the user account records 34 in the database 32.

The user selects the "Get Recommendations" button 92 to submit a request for recommendations from the online search system 16. In response to the receipt of the location information (e.g., the geographic coordinates and the geographic range information) from a searching client network node, the online search system 16 identifies ones of the identifiers that are associated with respective ones of the geographic location identifiers in the database that correspond to the received location information. If a target channel is specified by the user, the online search system 16 additionally filters the identifiers by selecting only those identifiers that are associated with channel identifiers that match the target channel identifier. If a target set of user identifiers is specified by the user, the online search system 16 additionally filters the identifiers by selecting only those identifiers that are associated with user identifiers that match any of the specified target user identifiers.

The online search system 16 ranks the identified ones of the identifiers based on the recommendation information that respectively is associated with the identifiers. In this process, the online search system 16 typically aggregates the credits that are allocated to each of the identifiers. If a target set of user identifiers is specified by the user, the online search system 16 determines the rankings based on only the recommendation information received from the specified target set of user identifiers.

The online search system 16 returns a list of the ranked identifiers (up to the maximum number specified in the input area 88) to the searching client network node. The ranked list of identifiers is displayed in the "Recommendations" display area 94 of the graphical user interface 82. Each of the identifiers (i.e., URL_1, . . . , URL_5) is presented in association with a respective ranking (i.e., 20, 15, 4, 2, 1) that was determined by the online search system 16 based on the recommendations that were received for the corresponding online documents and/or MPLs. In some examples, the online search system 16 also returns other metadata, such as title and sample and average geographic coordinates associated with the identifiers to be returned in response to user queries.

In response to the selection of one of the identifiers (e.g., URL_1) in the "Recommendations" display area 94, the communications application 26 copies the selected identifier into the "Selected URL" display area 96 and marks (e.g., with a flag icon 106) the location of map in the map area 98 that corresponds to the geographic location identifier that is associated with the selected identifier. In some examples, the online search system returns the average of the geographic coordinates associated with the identifiers in the "Recommendations" display area 94, and the communications application 26 displays and maps the average location. When a user wishes to recommend a particular online document and/or MPL, the user identifies the identifier to the communications application 26 simply by browsing to the particular online document and/or MPL with a browser application.

Figure 5:
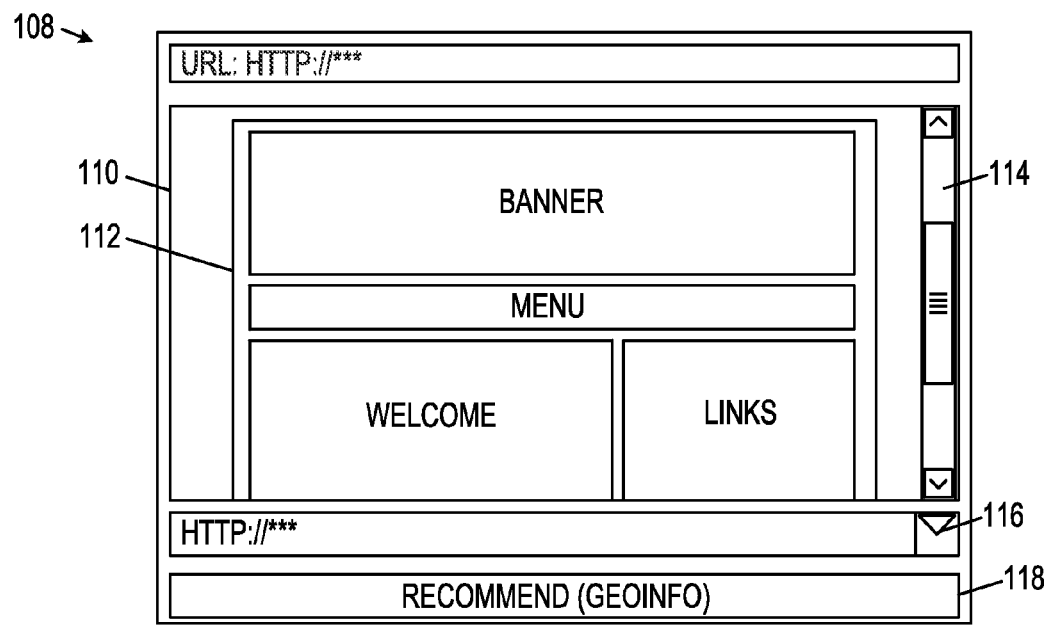
FIG. 5 is a diagrammatic view of another example of a client user interface according to the present disclosure.

FIG. 5 is a diagrammatic view of another example of a client user interface according to the present disclosure. In FIG. 5, the communications application 26 also opens up a graphical user interface 108 that includes a browser window 110, which displays a graphical representation 112 of the online document and/or MPL that corresponds to the selected online identifier. The browser window 110 optionally includes a scroll bar 114 that allows the user to scroll through the online representation 112. The interface 108 additionally includes a recommendations control 116 and a "Recommend" button 118, which includes a label (e.g., "geoinfo") that identifies the current channel that was selected by the user. In some examples, the graphical user interface 108 also includes a "Channel" button which causes the communications application 26 to submit to the online search system 16 a search on the most popular channels in the current geolocation. This information gives the user a hint what it makes sense to filter on.

Figure 6A:
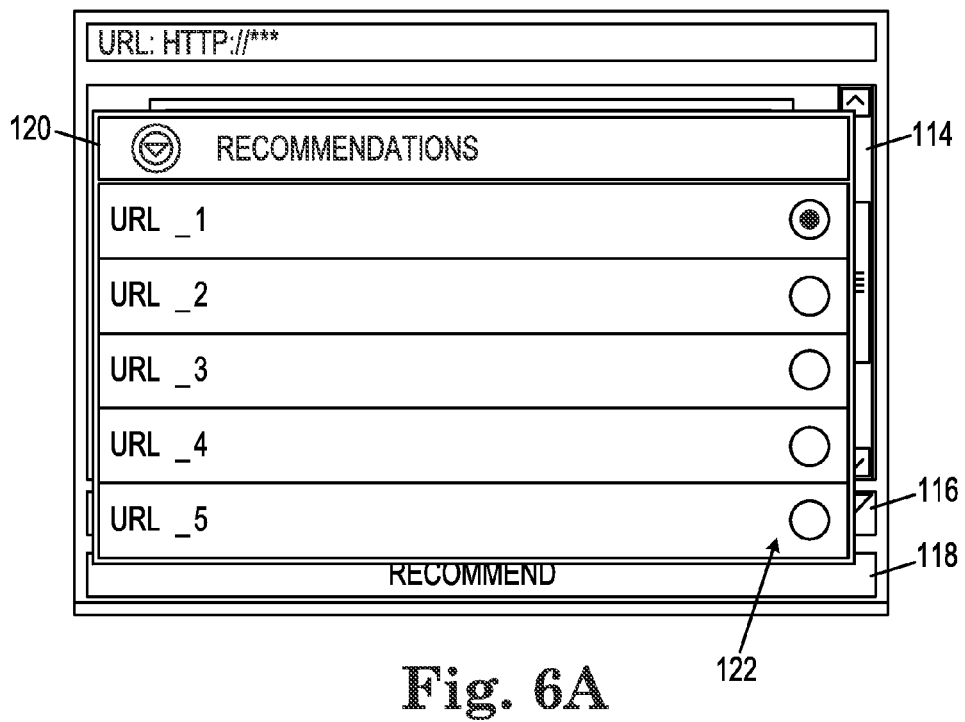
FIG. 6A is a diagrammatic view of another example of a client user interface according to the present disclosure.

FIG. 6A is a diagrammatic view of an example a client user interface according to the present disclosure. Referring to FIG. 6A, in response to user selection of the recommendations control 116, the communications application 26 opens a separate "Recommendations" window 120 that presents the ranked list of MPL identifiers that was received from the MPL search system 16. The user may select one of the presented MPL identifiers to browse by selecting the associated one of the radio control buttons 122 in the recommendations window 120.

In response to user selection of the "Recommend" button 99 in the graphical user interface 82 (FIG. 4) or the "Recommend" button 118 in the graphical user interface 108 (FIG. 5), the communications application prepares a submission and sends the submission to the MPL search system 16. The submission includes recommendation information in association with the current location information that is specified in geographic coordinates display area 84 (and optionally includes the geographic range information specified in the input area 88) and the identifier of the currently selected MPL identifier. In some examples, the recommendation information is specified by a set of recommendation configuration settings, which may be fixed or customizable by the user. The recommendation configuration settings typically include a user identifier that identifies the user and an amount of credit (also referred to as "submission credit") to allocate for each recommendation. In other examples, for each submission, the communications application 26 opens a dialog box that allows the user to specify at least some of the recommendation information that will be transmitted with the submission. The specified recommendation may include, for example, the amount of credit to allocate to the selected MPL, and an indication whether the recommendation is for (positive) or against (negative) the selected MPL.

In response to receipt of the submission from the client network node, the MPL search system 16 indexes the respective recommendation information and the respective MPL identifier in association with the respective geographic location identifier in the recommendation records database 28.

In some examples, the online search system 16 allows users to submit user-generated comments (or notes) in association with respective geographic location identifiers that identify respective geographic locations. This feature allows a user to submit a user-generated comment for any MPL and any point of interest (e.g., the location of a business or other location), even those points of interest that currently do not have an online presence (e.g., they are not associated with any online document, such as a web page). The geo-tagged comments are hosted by the search system 16, which allows the comments to be treated in the same way as other online documents or MPLs by the search system 16. For example, users of the client network nodes 12, 14 can submit recommendations for comments and the comments can be filtered based on channel selections and identification of target groups of user identifiers (e.g., friends).

Figure 6B:
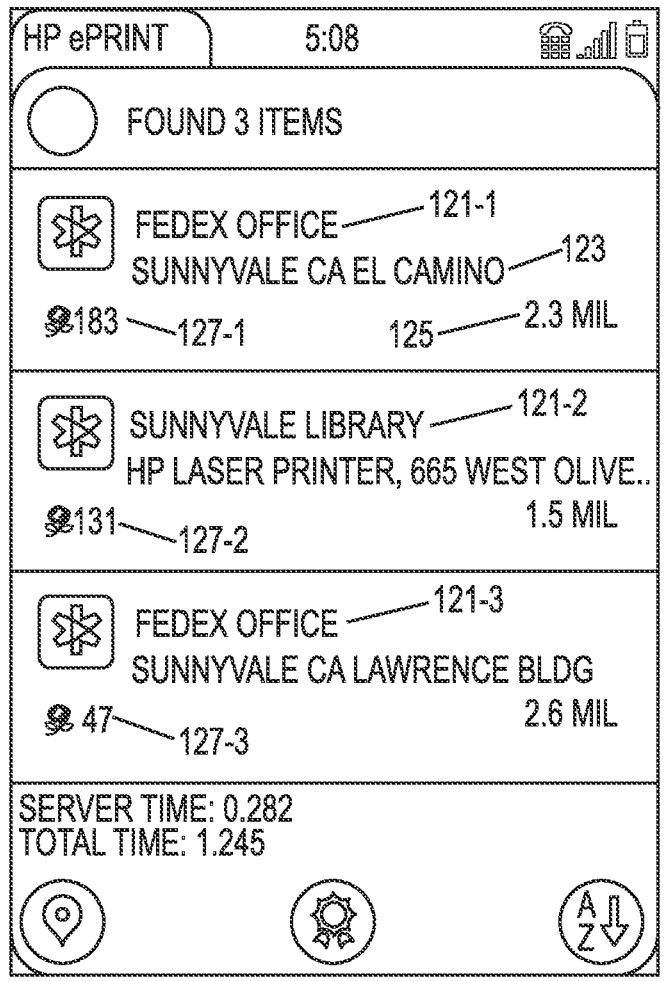
FIG. 6B illustrates an example view and an example user interface for recommending print locations according to the present disclosure.

FIG. 6B illustrates an example view and an example user interface, such as the window in FIG. 6A, for recommending print locations (e.g., MPLs) according to the present disclosure. A display on the user interface can include a listing of MPL information including the names of a number of MPLs, the provider's distance from the user, the geographic location of the provider, and the provider's compiled recommendation. For example, the name of an MPL is displayed at 121-1, and the geographic location of the provider is displayed at 123. A distance from the user to the provider is displayed at 125, and the provider's compiled recommendation is provided at 127-1. In the example in FIG. 6B, providers are listed in order of their recommendations, with the most highly recommended provider being displayed first. Provider 121-1 received a higher compiled recommendation than did providers 121-2 and 121-3, as illustrated at 127-1, 127-2, and 127-3, and is therefore displayed first.

Figure 6C:
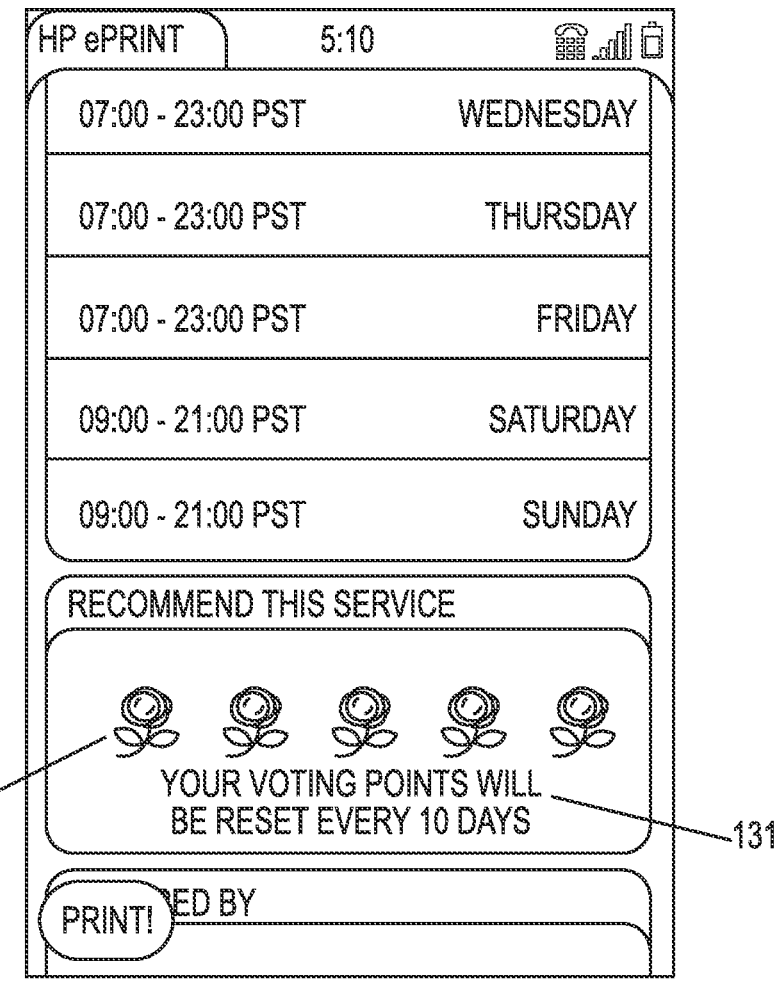
FIG. 6C illustrates another example view and another example user interface for recommending print locations according to the present disclosure.

FIG. 6C illustrates an example view and an example user interface for recommending print locations according to the present disclosure. An available number of a recommendation credit identifiers, or "votes", can be seen at 129. A user can be assigned a budget of votes (e.g., a predetermined temporal budget), and these votes can be represented by a symbol, such as roses, as seen at 129 of FIG. 6C. The budget may include a time limit, as well. For example, the user may be allowed a particular number of votes over a certain time period (e.g., 10 days) as seen at 131 of FIG. 6C. A user can click on one or more votes (e.g., roses) to submit a recommendation of the MPL. A first provider having more votes than a second provider may be ranked higher overall in the ranking system.

Figure 6D:
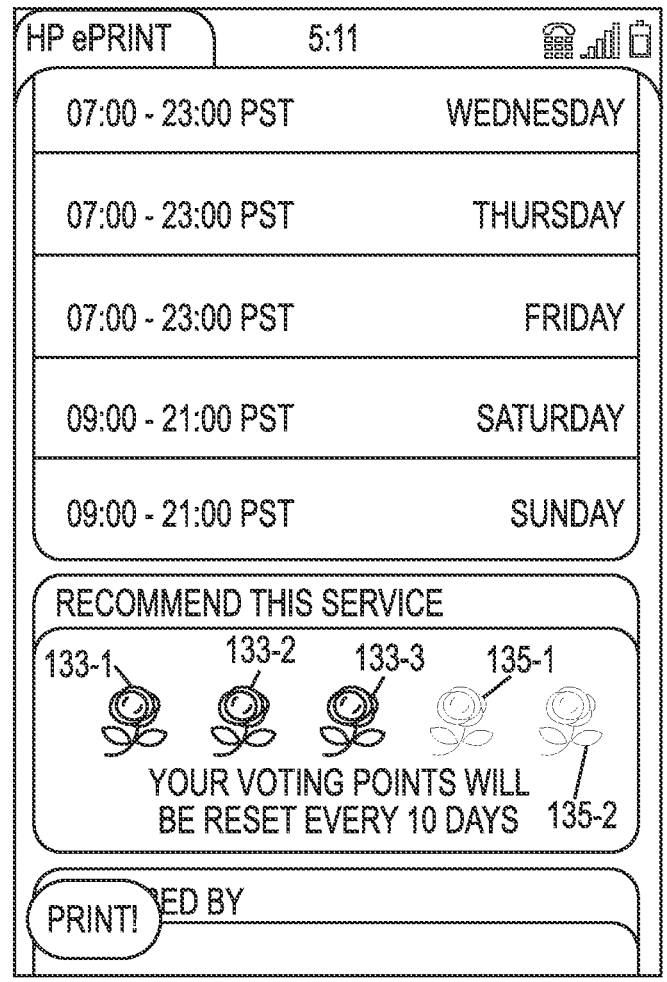
FIG. 6D illustrates another example view and another example user interface for recommending print locations according to the present disclosure.

FIG. 6D illustrates an example view and an example user interface for recommending print locations according to the present disclosure. The example view in FIG. 6D illustrates what a viewer may see after submitting votes for an MPL. As a user clicks on a vote (e.g., a rose) to recommend the MPL, the vote symbol changes its appearance in order to show the user that the vote has been cast. For example, in FIG. 6D, roses 133-1, 133-2, and 133-3 have not been selected, but a user has clicked on roses 135-1 and 135-2, and therefore submitted votes for the MPL.

Figure 7:
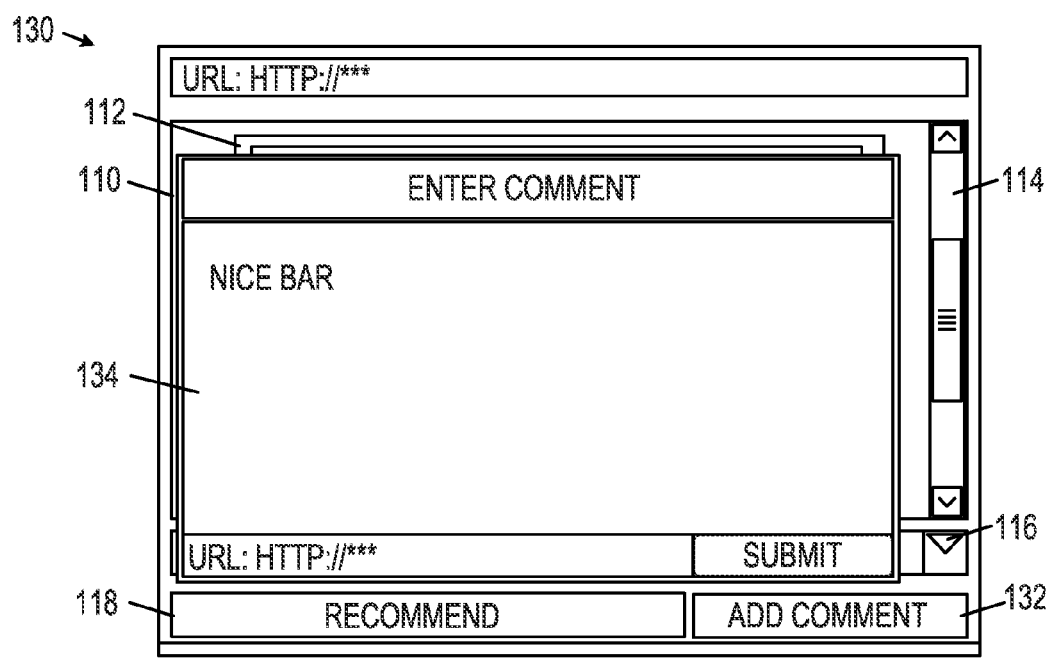
FIG. 7 is a diagrammatic view of another example of a client user interface according to the present disclosure.

FIG. 7 is a diagrammatic view of an example of a client user interface according to the present disclosure. FIG. 7 shows an example 130 of the browser window 82 that additionally includes an "Add Comment" button 132. In response to user selection of the "Add Comment" button 132, the communications application 26 opens an "Enter Comment" window 134 that allows the user to enter a comment (e.g., "Nice Bar"). In response to user selection of a "Submit" button in the "Enter Comment" window 132, the communications application 26 prepares a comment submission that includes the user-generated comment along with the user identifier that identifies the user, a geographic location identifier that identifies the currently selected location, and optionally includes an MPL identifier (if one is specified).

By way of example and not by way of limitation, FIG. 7 shows an example graphical user interface for interfacing with an online document search system 16. In accordance with this method, the online document search system 16 receives a respective submission from a given client network node, e.g., 12 and/or 14. The submission includes a user-generated comment that is generated by a user of the given client network node in association with a respective geographic location identifier identifying a respective geographic location. The online document search system 16 can create a respective online document identifier of the user-generated comment.

According to one or more examples, the online document search system 16 indexes the online document identifier of the user-generated comment in association with the respective geographic location identifier in the database.

A number of methods can be implemented by an online document search system. In accordance with one of the number of methods, the online document search system receives a respective submission from a given client network node. The submission includes a user-generated comment that is generated by a user of the given client network node in association with a respective geographic location identifier identifying a respective geographic location. The online document search system creates a respective online document identifier (e.g., an MPL identifier) of the user-generated comment. The online document search system indexes the respective online document identifier of the user-generated comment in association with the respective geographic location identifier in the database.

Once a comment has been indexed, the online document search system 16 is able to serve a renderable description of a graphical representation of the user-generated comment in response to receipt of a request from a client network node to view content associated with the online document identifier of the user-generated comment. In some embodiments, when an online document is displayed in the browser window, the most popular comments that are associated with that online document in the current geo-location also will be displayed. In addition, the online document search system 16 is able to receive a respective submission from a particular client network node in connection the hosted comment. The submission can include, for example, respective recommendation information in association with the respective online document identifier identifying the user-generated comment and a respective geographic location identifier identifying a respective geographic location. In response to the receipt of such a submission, the online document search system 16 indexes the respective recommendation information and the respective online document identifier of the user-generated comment in association with the respective geographic location identifier in the database 28.

As described in connection with FIGS. 6A-6D, the number of recommendations that a particular user may make within a time span is limited by the amount of credit that the user currently has available. Recommendation credits (or tickets) may be granted or purchased and used to increase prominence of an online document or MPL in connection with a geographic location. For example, users can be periodically issued credit (which also may be referred to as "currency") in the form of granted or purchased tickets that allows them to recommend a certain number of MPLs within a specified time window.

Figure 8:
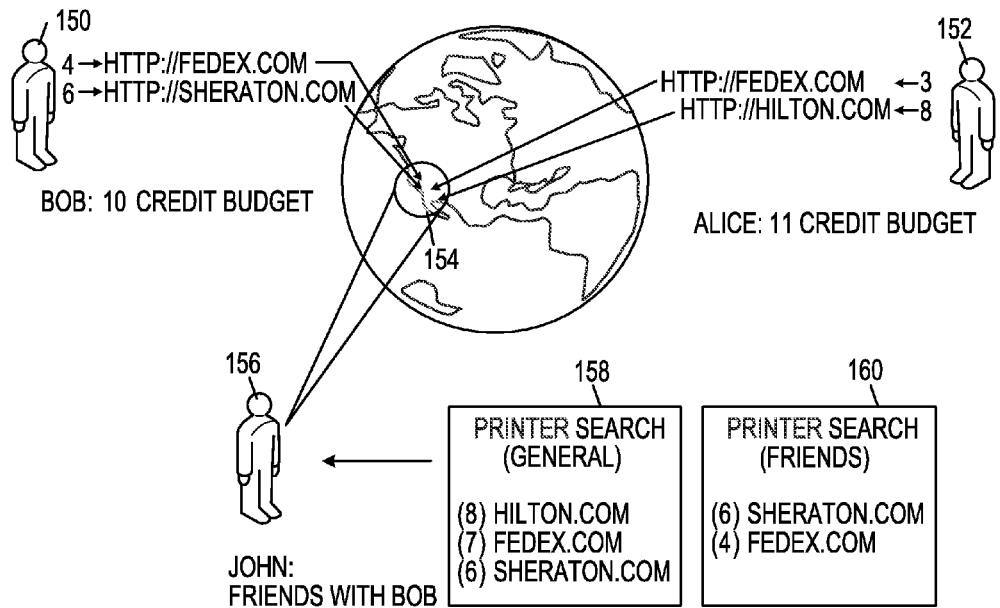
FIG. 8 is a diagrammatic view of an example of an online search based usage model according to the present disclosure.

FIG. 8 is a diagrammatic view of an example of an online search based usage model according to the present disclosure. FIG. 8 shows an example of an online search (e.g., MPL search) based usage model in which a first user 150 ("Bob") and a second user 152 ("Alice") both submit recommendations for MPLs in association with particular geographic locations within a circular geographic region 154, and a third user 156 ("John") submits requests for MPL identifiers that are associated with recommendations in the geographic region 154. In this example, Bob submits a 4-credit recommendation for the online identifier http://sheraton.com and a 6-credit recommendation for the online identifier http://fedex.com. Alice submits a 3-credit recommendation for the online identifier http://fedex.com and an 8-credit recommendation for the online identifier http://hilton.com. John submits two search requests. The first search request is a general search request for all the printing sites (e.g., MPLs) that are associated with the geographic region 154. In response to the first search request, the online search system 16 returns a ranked list 158 of the most popular (e.g., highest aggregated credit score) identifiers (URLs in the illustrated example) that are associated with the geographic region 154. The second search request is a friends-filtered search request for the printing sites that are associated with the geographic region 154 and are recommended by John's friends (e.g., Bob). In response to the second search request, the online search system 16 returns a ranked list 158 of the most popular (i.e., highest aggregated credit score) identifiers (URLs in the illustrated example) that are associated with the geographic region 154 and are recommended by Bob.

Figure 9:
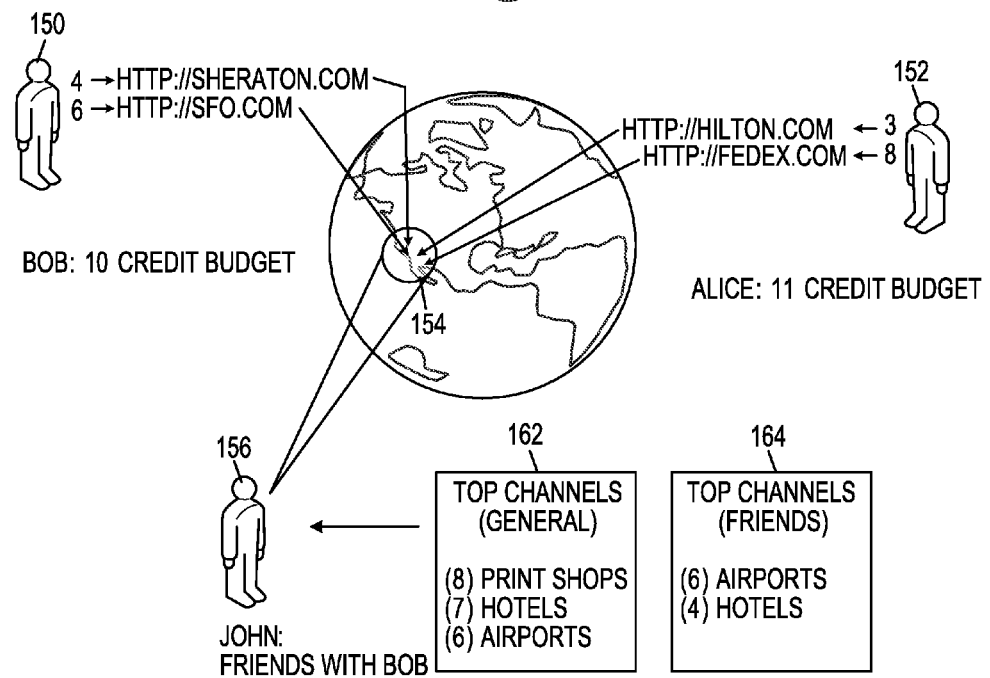
FIG. 9 is a diagrammatic view of an example of an online search based usage model according to the present disclosure.

FIG. 9 is a diagrammatic view of an example of an online search (e.g., MPL search) based usage model in which the first user 150 ("Bob") and the second user 152 ("Alice") both submit recommendations for MPLs and/or online documents associated with particular restaurants located within the circular geographic region 154, and the third user 156 ("John") submits requests for MPL identifiers that are associated with recommendations in the geographic region 154. In this example, Bob submits a 4-credit recommendation for the identifier http://sheraton.com in association with a "hotel" channel and a 6-credit recommendation for the identifier http://sfo.com in association with an "airport" channel. Alice submits a 3-credit recommendation for the identifier http://hilton.com in association with a "hotel" channel and an 8-credit recommendation for the identifier http://fedex.com in association with a "print shops" channel. John submits two search requests. The first search request is a general search request for the most popular channels that are associated with the geographic region 154. In response to the first search request, the online search system 16 returns a ranked list 162 of the most popular (e.g., highest aggregated credit score) channels that are associated with the geographic region 154. The second search request is a friends-filtered search request for the most popular channels that are associated with the geographic region 154 and are recommended by John's friends (e.g., Bob). In response to the second search request, the online search system 16 returns a ranked list 164 of the most popular (e.g., highest aggregated credit score) channels that are associated with the geographic region 154 and are recommended by Bob.

Figure 10:
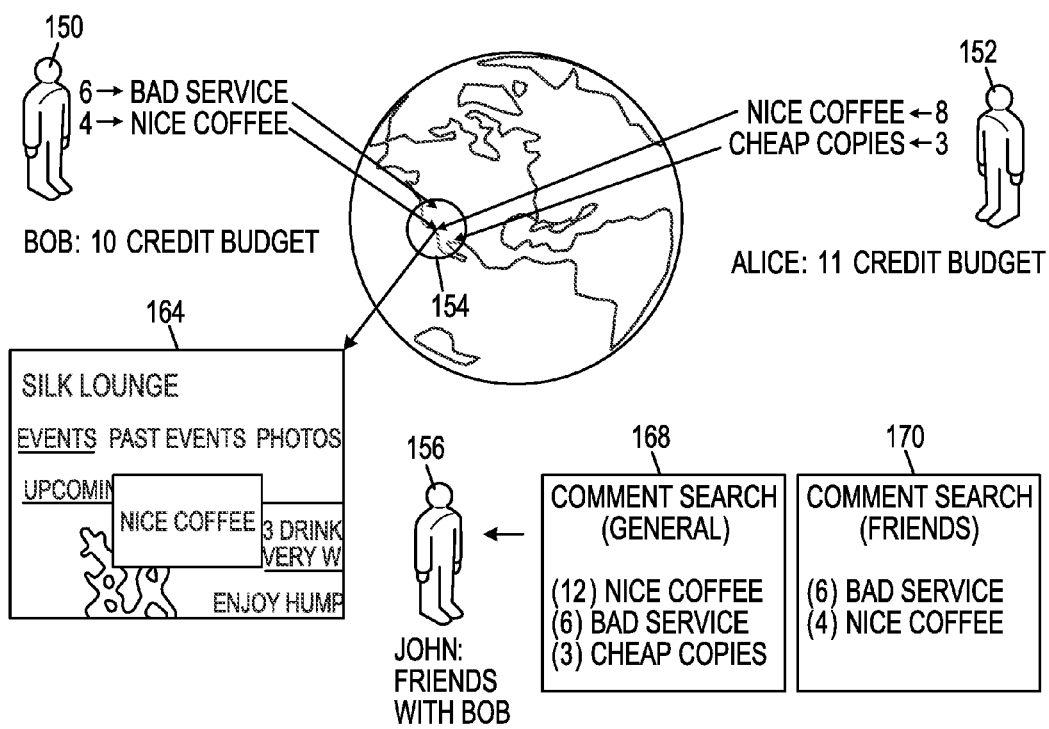
FIG. 10 is a diagrammatic view of an example of an online search based usage model according to the present disclosure.

FIG. 10 is a diagrammatic view of an example of an online search (e.g., MPL search) based usage model in which the first user 150 ("Bob") and the second user 152 ("Alice") both submit comments for MPLs and/or online documents associated with particular businesses that are located within the circular geographic region 154, and the third user 156 ("John") submits requests for identifiers that are associated with recommendations in the geographic region 154. In this example, Bob submits a 6-credit comment for an identifier that is associated with a web page 166 for the "Silk Lounge" and a 4-credit comment for a second identifier. Alice submits an 8-credit comment for the identifier that is associated with the web page 164 for the "Silk Lounge" and a 3-credit comment for a third identifier. John submits two search requests. The first search request is a general search request for all the comments that are associated with the geographic region 154. In response to the first search request, the online search system 16 returns a ranked list 168 of the most popular (i.e., highest aggregated credit score) comments that are associated with the geographic region 154. The second search request is a friends-filtered search request for the comments that are associated with the geographic region 154 and are recommended by John's friends (i.e., Bob). In response to the second search request, the online search system 16 returns a ranked list 170 of the most popular (i.e., highest aggregated credit score) comments that are associated with the geographic region 154 and are recommended by Bob. As shown in FIG. 10, when Bob views the web page 164 that is associated with the "Nice Coffee" comment in a web browser. In addition to viewing the web page 164, Bob also is able to see a graphical representation of the most popular comments that are associated with the web page 164; in this case, the only (hence, most popular) comment is the "Nice Coffee" comment.

The examples that are described herein provide systems and methods of searching for MPLs based on geography tagged recommendations. These examples enable users to recommend MPLs to others in connection with respective geographic locations and optionally with respective channels corresponding to categories respectively assigned to the MPLs. A subscribing user may be presented with ranked list of the most popular MPLs within a particular geographic location and optionally on a particular channel that is selected by the user.

What is claimed:
1. A method for recommending mobile print locations, comprising:
receiving recommendation, user, and geographic information for a first mobile print location (MPL) and a second MPL from a network node, wherein the recommendation information includes a recommendation credit identifier that when used as a recommendation for at least one of the first MPL and the second MPL decrements a predetermined recommendation credit identifier budget, using a processing resource;

indexing, in a database, the recommendation, user and geographic information for each of the first MPL and the second MPL as an automatically created uniform resource indicator (URI) on an MPL system;

ranking the first MPL and the second MPL based on the recommendation, user, and geographic information; and presenting a list, via a user interface, of the ranked first MPL and the second MPL.

2. The method of claim 1, further comprising searching and decoding the first MPL and the second MPL using the automatically created URI.

3. The method of claim 1, wherein the recommendation information is received using a recommender system.

4. The method of claim 3, further comprising facilitating, via the recommender system, the providing of incentives to MPL providers to offer MPL services to users.

5. The method of claim 1, wherein the list is sorted by at least one of the name of the MPL, a distance from a mobile device to the first and second MPL, a combination of the recommendation and geographic information, and a performance recommendation given to at least one of the first and second MPLs by a user.

6. The method of claim 1, wherein the quantity of recommendation information received from a single user is limited to a predetermined temporal budget.

7. The method of claim 1, wherein the recommendation, user, and geographic information are stored in a database on the MPL system.

8. The method of claim 1, further comprising displaying, via the user interface, a received user comment relating to each of the first and second MPLs.

* * * * *